US010438712B2

(12) United States Patent
DeGrado et al.

(10) Patent No.: US 10,438,712 B2
(45) Date of Patent: Oct. 8, 2019

(54) SOLUTION TARGET FOR CYCLOTRON PRODUCTION OF RADIOMETALS

(71) Applicant: MAYO FOUNDATION FOR MEDICAL EDUCATION AND RESEARCH, Rochester, MN (US)

(72) Inventors: Timothy R. DeGrado, Rochester, MN (US); Mukesh K. Pandey, Rochester, MN (US); John Byrne, Boston, MA (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 15/493,310

(22) Filed: Apr. 21, 2017

(65) Prior Publication Data

US 2017/0301427 A1    Oct. 19, 2017

Related U.S. Application Data

(63) Continuation of application No. 15/311,052, filed as application No. PCT/US2015/031140 on May 15, 2015.

(Continued)

(51) Int. Cl.
*G21G 1/10* (2006.01)
*H05H 6/00* (2006.01)
(Continued)

(52) U.S. Cl.
CPC ............... *G21G 1/10* (2013.01); *B01D 15/08* (2013.01); *G21G 1/001* (2013.01); *H05H 6/00* (2013.01); *G21G 2001/0021* (2013.01)

(58) Field of Classification Search
CPC .. G21G 1/10; G21G 1/001; G21G 2001/0021; B01D 15/08; H05H 6/00
(Continued)

(56) References Cited

U.S. PATENT DOCUMENTS 5,409,677 A * 4/1995 Zinn ........................ G21G 1/10
376/189
5,729,821 A    3/1998 Knapp et al.
(Continued)

FOREIGN PATENT DOCUMENTS

WO    WO-0187235 A2 * 11/2001 ............... G21G 1/10
WO    2013058345 A1    4/2013

OTHER PUBLICATIONS

Moreira, "Cyclotron Production of 68Ga using a 68Zn-based liquid target", MS thesis, 2013. (Year: 2013).*
(Continued)

*Primary Examiner* — Jack W Keith
*Assistant Examiner* — Daniel Wasil
(74) *Attorney, Agent, or Firm* — Quarles & Brady LLP

(57) ABSTRACT

Methods of producing and isolating $^{68}$Ga, $^{89}$Zr, $^{64}$Cu, $^{63}$Zn, $^{86}$Y, $^{61}$Cu, $^{99m}$Tc, $^{45}$Ti, $^{13}$N, $^{52}$Mn, or $^{44}$Sc and solution targets for use in the methods are disclosed. The methods of producing $^{68}$Ga, $^{89}$Zr, $^{64}$Cu, $^{63}$Zn, $^{86}$Y, $^{61}$Cu, $^{99m}$Tc, $^{45}$Ti, $^{13}$N, $^{52}$Mn, or $^{44}$Sc include irradiating a closed target system with a proton beam. The closed target system can include a solution target. The methods of producing isolated $^{68}$Ga, $^{89}$Zr, $^{64}$Cu, $^{63}$Zn, $^{86}$Y, $^{61}$Cu, $^{99m}$Tc, $^{45}$Ti, $^{52}$Mn, or $^{44}$Sc further include isolating $^{68}$Ga, $^{89}$Zr, $^{64}$Cu, $^{63}$Zn, $^{86}$Y, $^{61}$Cu, $^{99m}$Tc, $^{45}$Ti, $^{52}$Mn, or $^{44}$Sc by ion exchange chromatography. An example solution target includes a target body including a target cavity for receiving the target material; a housing defining a passageway for directing a particle beam at the target cavity; a target window for covering an opening of the
(Continued)

target cavity; and a coolant gas flow path disposed in the passageway upstream of the target window.

13 Claims, 11 Drawing Sheets

Related U.S. Application Data

(60) Provisional application No. 61/993,365, filed on May 15, 2014.

(51) Int. Cl.
  *B01D 15/08* (2006.01)
  *G21G 1/00* (2006.01)

(58) Field of Classification Search
  USPC .................................. 376/194, 195
  See application file for complete search history.

(56) References Cited

U.S. PATENT DOCUMENTS

| | | | |
|---|---|---|---|
| 5,902,566 | A | 5/1999 | Chinol et al. |
| 6,011,825 | A | 1/2000 | Welch et al. |
| 2003/0127395 | A1 | 7/2003 | Bond et al. |
| 2003/0219366 | A1 | 11/2003 | Horwitz et al. |
| 2004/0000637 | A1 | 1/2004 | Wieland |
| 2005/0061994 | A1* | 3/2005 | Amini ............... H05H 6/00 250/492.1 |
| 2008/0035542 | A1 | 2/2008 | Mourtada et al. |
| 2010/0086095 | A1 | 4/2010 | Ogasawara et al. |
| 2011/0214995 | A1* | 9/2011 | Huang ............... C25C 1/22 205/340 |
| 2012/0061325 | A1 | 3/2012 | Yokel et al. |
| 2012/0307953 | A1* | 12/2012 | Stevenson ............ G21G 1/10 376/190 |
| 2013/0055855 | A1 | 3/2013 | Le |
| 2013/0102772 | A1 | 4/2013 | Eshima et al. |
| 2013/0259180 | A1 | 10/2013 | Norling et al. |

OTHER PUBLICATIONS

Jensen, "Direct production of Ga-68 from proton bombardment of concentrated aqueous solutions of [Zn-68] zinc chloride", 13th International Workshop on Targetry and Target Chemistry, 2011. (Year: 2011).*
Pandey, "Production of 89Zr via the 89Y (p, n) 89Zr reaction in aqueous solution: effect of solution composition on in-target chemistry", Nuclear medicine and biology 41.4 (2014) 309-316. (Year: 2014).*
Kasbollah, "Zirconium-89 for positron emission tomography and hydroxamate resin column for gallium-68 generator", (2013). (Year: 2013).*
Nakayama, "Separation of 68Ga from 68Ge using a macroporous organic polymer containing N-methylglucamine groups", Analytica chimica acta, 453, No. 1 (2002) 135-141. (Year: 2002).*
Hoehr, "Producing radiometals in liquid targets: Proof of feasibility with 94 m Tc", AIP Conference proceedings. vol. 1509. No. 1. AIP, 2012. (Year: 2012).*
Ferreira, "Production of gallium-68 in a liquid cyclotron target: Physics and viability", Oct. 16, 2013. (Year: 2013).*
Sadeghi, "Cyclotron production of 68Ga via proton-induced reaction on 68Zn target", Nukleonika 54 (2009) 25-28. (Year: 2009).*
Egan, "Isobaric Analog Resonances in the Zn 68 (p, n) Ga 68 Reaction from 4 to 5 MeV", Physical Review C 1, No. 5 (1970) Year: 1970) 1767.*
Lundqvist, "Targeting peptides and positron emission tomography", Peptide Science: Original Research on Biomolecules 66.6 (2002) 381-392. (Year: 2002).*
Allen, Radiation Chemistry of Aqueous Solutions, Journal of Physical Chemistry, 1948, 52(3):479-490.

Balcerzyk, et al., Direct and Indirect Radiolytic Effects in Highly Concentrated Aqueous Solutions of Bromide, Journal of Physical Chemistry A, 115(17):4326-4333.
Balcerzyk, et al., Picosecond Pulse Radiolysis of Direct and Indirect Radiolytic Effects in Highly Concentrated Halide Aqueous Solutions, Journal of Physical Chemistry A, 2011, 115:9151-9159.
Balcerzyk, et al., Picosecond Pulse Radiolysis Study of Highly Concentrated Nitric Acid Solutions: Formation Mechanism of NO3 Radical, Journal of Physical Chemistry A, 2012, 116:7302-7307.
Banerjee, et al., Clinical Applications of Gallium-68, Appl. Radiat. Isot., 2013, 0:2-13.
Bansal, et al., Novel 89Zr Cell Labeling Approach for PET-Based Cell Trafficking Studies, EJNMMI Research, 2015, 5:19, 11 pages.
Barr, et al., Hydrogen Atoms in the Radiolysis of Water, Journal of Physical Chemistry, 1959, 63(6):928-931.
Baum, et al., Theranostics: From Molecular Imaging Using Ga-68 Labeled Tracers and PET/CT to Personalized Radionuclide Therapy—The Bad Berka Experience, Theranostics, 2012, 2(5):437-447.
Belosi, et al., Generator Breakthrough and Radionuclidic Purification in Automated Synthesis of 68Ga-DOTANOC, Current Radiopharmaceuticals, 2013, 6(2):72-77.
Bonin, et al., First Observation of Electron Paired with Divalent and Trivalent Nonreactive Metal Cations in Water, Journal of Physical Chemistry A, 2004, 108:6817-6819.
Bonin, et al., Absorption Spectrum of the Hydrated Electron Paired with Nonreactive Metal Cations, Radiation Physics and Chemistry, 2005, 74(5):288-296.
Caramelle, Salt Radiolysis. 2. Analysis of Radiolysis Gases, Comm. Eur. Communities, 1991, 151:14-37.
Chang, et al., 89Zr-Radiolabeled Trastuzumab Imaging in Orthotopic and Metastatic Breast Tumors, Pharmaceuticals, 2012, 5:79-93.
Charoenphun, et al., [89Zr]Oxinate4 for Long-Term In Vivo Cell Tracking by Positron Emission Tomography, Eur. J. Nucl. Med, Mol, Imaging, 2015, 42:278-287.
Davidson-Moncada, et al., A Novel Method to Study the In Vlvo Trafficking and Homing of Adoptively Transferred NK Cells in Rhesus Macaques and Humans, Blood, 2014, 124:659.
Dean, Predictions of Pressure and Temperature Effects Upon Radical Addition and Recombination Reactions, Journal of Physical Chemistry, 1985, 89(21):4600-4608.
DeGrado, et al., Cyclotron Production of 89Zr Using a Solution Target, Journal of Nuclear Medicine, 2012, 53(Suppl 1):133.
DeGrado, et al., A Solution Target Approach for Cyclotron Production of 89Zr: Understanding and Coping with In-Target Electrolysis, Journal of Labelled Compounds & Radiopharmaceuticals, 2011, 54:S248.
Dejesus, et al., Production and Purification of 89Zr, a Potential PET Antibody Label, International Journal of Radiation Applications and Instrumentation, Part A. Applied Radiation and Isotopes, 1990, 41(8):789-790.
De Vries, 89Zr-bevacizumab PET Imaging in Patients with Neuroendocrine Tumors (NETPET), ClinicalTrials.gov Identifier: NCT01338090, Apr. 2, 2012.
El Omar, et al., Time-Dependent Radiolytic Yield of OH Radical Studied by Picosecond Pulse Radiolysis, Journal of Physical Chemistry A, 2011, 115:12212-12216.
El Omar, et al., Spur Reactions Observed by Picosecond Pulse Radiolysis in Highly Concentrated Bromide Aqueous Solutions, Journal of Physical Chemistry A, 2013, 117:2287-2293.
El Omar, et al., Competition Reactions of H2O Radical in Concentrated Cl Aqueous Solutions: Picosecond Pulse Radiolysis Study, Journal of Physical Chemistry A, 2012, 116:11509-11518.
Engle, et al., Very High Specific Activity 66/68Ga from Zinc Targets for PET, Appl. Radiat. Isot., 2012, 70 (8):1792-1796.
Ferry, et al., Temperature Effects on the Kinetics of Carbonate Radical Reactions in Near-Critical and Supercritical Water, Journal of Physical Chemistry A, 1999, 103(18):3438-3441.
Hayon, et al., Evidence for Two Kinds of "H Atoms" in the Radiation Chemistry of Water, Journal of Physical Chemistry, 1961, 65(12):2181-2185.
Hoehr, et al., Radiometals from Liquid Targets: 94mTc Production Using a Standard Water Target on a 13 MeV Cyclotron, Applied Radiation and Isotopes, 2012, 70:2308-2312.

(56) References Cited

OTHER PUBLICATIONS

Hofman, et al., High Management Impact of Ga-68 DOTATATE (GaTate) PET/CT for Imaging Neuroendocrine and Other Somatostatin Expressing Tumours, Journal of Medical Imaging and Radiation Oncology, 2012, 56:40-47.
Holland, et al., Standardized Methods for the Production of High Specific-Activity Zirconium-89, Nuclear Medicine and Biology, 2009, 36:729-739.
Jacobsson, et al., Normal Uptake of 68Ga-DOTA-TOC by the Pancreas Uncinate Process Mimicking Malignancy at Somatostatin Receptor PET, Clinical Nuclear Medicine, 2012, 37(4):362-365.
Jensen, et al., Direct Production of Ga-68 from Proton Bombardment of Concentrated Aqueous Solutions of [Zn-68] Zinc Chloride, Proceedings of 13th International Workshop on Targetry and Target Chemistry, 2011, Abstract 052.
Kasbollah, et al., Review on Production of 89Zr in a Medical Cyclotron for PET Radiopharmaceuticals, J. Nucl. Med. Technol., 2013, 41:35-41.
Kaucic, et al., Effect of Cation Vacancies on Radiolysis of Sodium Nitrate, Transactions of the Faraday Society, 1969, 65:1083-1090.
Kumbhar, et al., Electrodeposition of Yttrium from a Nonaqueous Bath, Metal Finishing, 1995, 93(4):28, 30-31.
Lampre, et al., Oxidation of Bromide Ions by Hydroxyl Radicals: Spectral Characterization of the Intermediate BrOH, Journal of Physical Chemistry A, 2013, 117(5):877-887.
Le Caer, Water Radiolysis: Influence of Oxide Surfaces on H2 Production Under Ionizing Radiation, Water, 2011, 3:235-253.
Leu, et al., Heterogeneous Reactions of HNO3(g) + NaCl(s)-HcI(g) + NaNo3(s) and N2o5(g) + NaCI(s)—CiNo2(g) + NaNOa3(s), Journal of Physical Chemistry, 1995, 99:13203-13212.
Lewis, et al., Long Lived and Unconventional PET Radionuclides, Pomper MG, Gelovani JG, Editors, 2009, pp. 283-292.
Link, et al., 89Zr for Antibody Labeling and Positron Emission Tomography, Journal of Labelled Compounds and Radiopharmaceuticals, 1986, 23(10-12):1297-1298.
Maastricht Radiation Oncology, Non-Invasive Imaging of Cetuximab-Zr. 89 Uptake Wit PET: A Phase 1 Trial in Stage IV Cancer Patients (Cetuximab XZr89), ClinicalTrials.gov Identifier: NCT00691548, Apr. 9, 2015.
Meijs, et al., Production of Highly Pure No-Carrier Added 89Zr for the Labelling of Antibodies with a Positron Emitter, Appl. Radiat. Isot., 1994, 45(12):1143-1147.
Mezyk, et al., Temperature Dependence of Hydrogen Atom Reaction with Nitrate and Nitrite Species in Aqueous Solution, Journal of Physical Chemistry A, 1997, 101(35):6233-6237.
Mulik, et al., Development and Optimization of Twenty-Four Hour Manual Methods for the Collection and Colorimetric Analysis of Atmospheric NO2, International Journal of Environmental Analytical Chemistry, 1974, 3(4):333-348.
Niayak, et al., Radioimmunoimaging with Longer-Lived Positron-Emitting Radionuclides: Potentials and Challenges, Bioconjug. Chem., 2009, 20(5):825-841.
Oberg, Gallium-68 Somatostatin Receptor PET/CT: Is It Time to Replace 111Indium DTPA Octreotide for Patients with Neuroendocrine Tumors?, Endocrine, 2012, 42:3-4.
Oosting, Visualizing Vascular Endothelial Growth Factor (VEGF) Producing Lesions in Von Hippel-Lindau Disease (VHLimage), ClinicalTrials.gov Identifier: NCT0090970, Nov. 5, 2012.
Oosting-Lenstra, VEGF Imaging in Renal Cell Carcinoma (Renimage), ClinicalTrials.gov Identifier: NCT00831857, Oct. 1, 2015.
Pandey, et al., Synthesis and Preliminary Evaluation of N-(16-18F-Fluorohexadecanoyl)ethanolamine (18F-FHEA) as a PET Probe of N-Acylethanolamine Metabolism in Mouse Brain, ACS Chemical Neuroscience, 2014, 5(9):793-802.
Pandey, et al., Cyclotron Production of 68Ga Via the 68Zn(p,n)68Ga Reaction in Aqueous Solution, Am. J . Nucl. Med. Mol. Imaging, 2014, 4(4):303-310.
Pandey, et al., Production of 89Zr Via the 89Y(p,n)89Zr Reaction in Aqueous Solution: Effect of Solution Composition on In-Target Chemistry, Nuclear Medicine and Biology, 2014, 41:309-316.
Patrascu, et al., The Purification and the Quality Control of 68Ga Eluates from 68Ge/68Ga Generator, Romanian Reports in Physics, 2011, 63(4):988-996.
Peschke, et al., Comparison of Different Methods for Determination of sub-ppb Levels of NO2 in Ambient Air Using Solid Adsorbent Sampling, Fresenius Z Anal Chem, 1988, 330(7):581-587.
Ralis, et al., Liquid Target System for Production of 86Y, ESRR'10-15th Europ. Symp. Radiopharmacy, Edinburgh, 2010, Abstract 042.
ROSCH, Past, Present and Future of 68Ge/68Ga Generators, Applied Radiation and Isotopes, 2013, 76:24-30.
Sadeghi, et al., Determination of 68Ga Production Parameters by Different Reactions Using ALICE and TALYS Codes, Indian Academy of Sciences, 2009, 72(2):335-341.
Sadeghi, et al., Cyclotron Production of 68Ga Via Proton-Induced Reaction on 68Zn Target, Nukleonika, 2009, 54 (1):25-28.
Sadeghi, et al., Targetry of Y2O3 on a Copper Substrate for the Non-Carrier-Added 89Zr Production Via 89Y(p,n) 89Zr Reaction, Kemtechnik, 2010, 75(5):298-302.
Sato, et al., Cell Labeling Using Zr-89—Comparison with In-111 Oxine, Proceedings World Molecular Imaging Congress, Savannah, GA, 2013, vol. 2013, Poster Session 4, Presentation No. P 533.
Schmidhammer, et al., Distance Dependence of the Reaction Rate for the Reduction of Metal Cations by Solvated Electrons: A Picosecond Pulse Radiolysis Study, Journal of Physical Chemistry A, 2010, 114(45):12042-12051.
Schreiter, et al., Cost Comparison of 111In-DTPA-octreotide Scintigraphy and 68Ga-DOTATOC PET/CT for Staging Enteropancreatic Neuroendocrine Tumours, European Journal of Nuclear Medicine and Molecular Imaging, 2012, 39(1):72-82.
Schroder, VEGF Early Imaging for Breast Cancer, ClinicalTrials.gov Identifier: NCT00991978, Mar. 29, 2012.
Smith, et al., The Untapped Potential of Gallium 68-PET: The Next Wave of 68Ga-agents, Applied Radiation and Isotopes, 2013, 76:14-23.
Stel'Makh, et al., Radiation-Induced Gas Evolution in Neutral and Alkaline Aqueous Sodium Nitrate and Sodium Acetate Solutions Simulating Liquid Radioactive Waste, High Energy Chemistry, 1998, 32(6):377-380.
Strelow, Quantitative Separation of Gallium from Zinc, Copper, Indium, Iron(III) and Other Elements by Cation-Exchange Chromatography in Hydrobromic Acid-Acetone Medium, Talanta, 1980, 27(3):231-236.
Szelecsenyi, et al., Evaluated Cross Section and Thick Target Yield Data Bases of Zn+p Processes for Practical Applications, Applied Radiation and Isotopes, 1998, 49(8):1005-1032.
Takacs, et al., Validation and Upgrading of the Recommended Cross-Section Data of Charged Particle Reactions: Gamma Emitter Radioisotopes, Nuclear Instruments and Methods in Physics Research B, 2005, 240(4):790-802.
Van De Watering, et al., Zirconium-89 Labeled Antibodies: A New Tool for Molecular Imaging in Cancer Patients, BioMed Research International, vol. 2014, Article ID 203601, 13 pages.
Van Der Meulen, et al., The Separation of Fe from Ga to Produce Ultrapure 67Ga, Z. Naturforsch, 2007, 62b:483-486.
Van Dongen, et al., Immuno-Positron Emission Tomography: Shedding Light on Clinical Antibody Therapy, Cancer Biotherapy and Radiopharmaceuticals, 2010, 25(4):375-385.
Van Dongen, et al., Immuno-PET: A Navigator in Monoclonal Antibody Development and Applications, The Oncologist, 2007, 12:1379-1389.
Velikyan, Prospective of 68Ga-Radiopharmaceutical Development, Theranostics, 2014, 4(1):47-80.
Verel, et al., 89Zr Immuno-PET: Comprehensive Procedures for the Production of 89Zr-Labeled Monoclonal Antibodies, J. Nucl. Med., 2003, 44:1271-1281.
Wolff, et al., Picosecond Pulse Radiolysis Studies. II. Reactions of Electrons with Concentrated Scavengers, Journal of Chemical Physics, 1970, 53(11):4211-4215.
Yakabuskie, et al., Long-Term γ-Radiolysis Kinetics of NO3 and NO2 Solutions, Journal of Physical Chemistry A, 2011, 115(17):4270-4278.
Yamaguchi, et al., Estimation of Yields of OH Radicals in Water Irradiated by Ionizing Radiation, J. Radiat. Res., 2005, 46:333-341.

(56) References Cited

OTHER PUBLICATIONS

Zimmerman, Current Status and Future Needs for Standards of Radionuclides Used in Positron Emission Tomography, Applied Radiation and Isotopes, 2013, 76:31-37.
Zweit, et al., Production of No-Carrier-Added Zirconium-89 for Positron Emission Tomography, International Journal of Radiation Applications and Instrumentation Part A. Applied Radiation and Isotopes, 1991, 42(2):199-201.
PCT International Search Report and Written Opinion, PCT/US2015/031140, dated Nov. 4, 2015.
Nagatsu, et al., An Alumina Ceramic Target Vessel for the Remote Production of Metallic Radionuclides by In Situ Target Dissolution, Nuclear Medicine and Biology, 2012, 39:1281-1285.
European Patent Office, Extended European Search Report, Application No. 15793539.6, dated Nov. 21, 2017, 10 pages.

* cited by examiner

SOLUTION TARGET FOR CYCLOTRON PRODUCTION OF RADIOMETALS

CROSS-REFERENCE TO RELATED APPLICATIONS

This application is a continuation of U.S. patent application Ser. No. 15/311,052 filed Nov. 14, 2016, which is a 371 application of PCT/US2015/031140 filed May 15, 2015, which claims priority to U.S. Provisional Patent Application No. 61/993,365 filed on May 15, 2014.

STATEMENT REGARDING FEDERALLY SPONSORED RESEARCH

This invention was made with government support under DE-SC0008947 awarded by the Department of Energy. The government has certain rights in the invention.

BACKGROUND OF THE INVENTION

1. Field of the Invention

The present invention relates to labeled radiopharmaceuticals.

2. Description of the Related Art

Radiometals (e.g., $^{64}Cu$, $^{89}Zr$, $^{68}Ga$, $^{86}Y$ and $^{99m}Tc$) play a pivotal role in nuclear medicine as therapeutic and imaging agents for radiation therapy and labeling of biologically important macromolecules like proteins, peptides and antibodies.

In the recent past, a rapid increase has been noted in both clinical and preclinical studies involving $^{68}Ga$-labeled radiopharmaceuticals [Ref. 1-5]. This increase can be attributed to the favorable physical characteristics of $^{68}Ga$ ($E_{\beta^+ max}$ 1.8 MeV, $\beta^+$ 89%, $T_{1/2}$=67.7 minutes) for imaging various rapidly changing processes (proliferation, apoptosis, angiogenesis) and targets (growth hormones, myocardial and pulmonary perfusion, inflammation and infection), and to some extent, to newer, more reliable production and labeling methods [Ref. 1-5]. Gallium-68 labeled somatostatin analogs have already shown their superiority over the existing agent $^{111}In$-DTPA-octreotide through enhanced sensitivity, specificity, accuracy and cost effectiveness for the diagnosis of patients with neuroendocrine tumors [Ref. 1, 6-9].

The clinical promise of $^{68}Ga$-labeled radiopharmaceuticals clearly warrants growth of the supply of $^{68}Ga$ to meet the increasing demand in various nuclear medicine facilities. Presently, $^{68}Ga$ can be produced by two different approaches, (1) solid targetry [Ref. 10,11] and (2) the $^{68}Ge/^{68}Ga$ generator [Ref. 12]. The former requires high capital cost and expertise and specialized cyclotron facilities that accommodate solid targets, whereas, the latter is more broadly accessible in nuclear medicine facilities not equipped with an on-site cyclotron. The simplicity and lower capital cost of the $^{68}Ge/^{68}Ga$ generator have made it more popular among the nuclear medicine facilities with relatively lower number of requirements for $^{68}Ga$ labeled doses [Ref. 1, 12]. However, the breakthrough of trace quantities of the long-lived $^{68}Ge$ parent isotope ($t_{1/2}$=271 days) into the eluted $^{68}Ga$ remains a concern [Ref. 13]. Furthermore, with increasing applicability of $^{68}Ga$-labeled radiopharmaceuticals, one can foresee a need for alternative production methods to meet the increasing demand especially for the relatively busy nuclear medicine centers having an on-site cyclotron. There have been previous attempts to produce $^{68}Ga$ using a cyclotron, initially employing a solid target method using $^{68}Zn$ electrodeposition on a copper substrate [Ref. 10, 14] and more recently using a solution target containing an enriched $^{68}ZnCl_2$ solution [Ref. 15]. The solid target methods require a lengthy separation step, which is not optimal for short-lived isotopes like $^{68}Ga$, as well as expensive solid target infrastructure.

Thus, needed in the art are methods and systems to extend the applicability of the solution target approach to the production of $^{68}Ga$ and other radiometals using a low energy cyclotron.

SUMMARY OF THE INVENTION

The present invention overcomes the aforementioned drawbacks by disclosing improved methods and systems for preparing radionuclides (e.g., $^{68}Ga$, $^{89}Zr$, $^{64}Cu$, $^{63}Zn$, $^{86}Y$, $^{61}Cu$, $^{99m}Tc$, $^{45}Ti$, $^{13}N$, $^{52}Mn$, or $^{44}Sc$). The methods of producing radionuclides (e.g., $^{68}Ga$, $^{89}Zr$, $^{64}Cu$, $^{63}Zn$, $^{86}Y$, $^{61}Cu$, $^{99m}Tc$, $^{45}Ti$, $^{13}N$, $^{52}Mn$, or $^{44}Sc$) may comprise irradiating a closed target system with a proton beam. The closed target system may comprise a solution target.

This disclosure provides a solution target for production of a radionuclide from a target material. The solution target comprises a target body including a target cavity for receiving the target material; a housing defining a passageway for directing a particle beam at the target cavity; a target window foil for covering an opening of the target cavity; and a coolant flow path disposed in the passageway upstream of the target window. In one version of the present disclosure, there is provided a cyclotron solution target with improved heat transfer characteristics for production of radiometals. The target can be used in medium energy cyclotrons (11-20 MeV protons) for the production of radionuclides (e.g., $^{68}Ga$, $^{89}Zr$, $^{64}Cu$, $^{63}Zn$, $^{86}Y$, $^{61}Cu$, $^{99m}Tc$, $^{45}Ti$, $^{13}N$, $^{52}Mn$, or $^{44}Sc$). The target has improved thermal transfer characteristics needed for cooling of the target solution. The target includes a water-cooled insert and a helium cooled region between the cyclotron vacuum and the solution. In one embodiment, a first foil separates the cyclotron vacuum from the helium flow region and a second foil (e.g., 20-30 microns) separates the helium region from the target solution. The geometry of the target insert is designed to maximize the heat transfer from the target solution to the cooling water.

In another aspect, the disclosure provides a solution target system for production of a radionuclide from a target solution. The system comprises a target body including a target cavity; a housing defining a passageway for directing a particle beam at the target cavity; a target solution distribution valve in fluid communication with the target cavity; a first source of a first target solution, the first source being in fluid communication with the target solution distribution valve; and a second source of a second target solution, the second source being in fluid communication with the target solution distribution valve, wherein the target solution distribution valve is movable from a first distribution position in which the first target solution flows into the target cavity to a second distribution position in which the second target solution flows into the target cavity. In one form, the system provides a target solution loading and unloading system that can select from up to six different metal solutions as reagents. There may also be up to six different delivery lines to minimize cross-contamination of isotopes.

In yet another aspect, the disclosure provides a method for producing a solution including a radionuclide, the method comprising bombarding a target solution with protons to produce a solution including a radionuclide, wherein the radionuclide is selected from $^{68}$Ga, $^{89}$Zr, $^{64}$Cu, $^{63}$Zn, $^{86}$Y, $^{61}$Cu, $^{99m}$Tc, $^{45}$Ti, $^{13}$N, $^{52}$Mn, and $^{44}$Sc.

The foregoing and other aspects and advantages of the invention will appear from the following description. In the description, reference is made to the accompanying drawings that form a part hereof, and in which there is shown by way of illustration certain embodiments of the invention. Such embodiments do not necessarily represent the full scope of the invention, however, and reference is made therefore to the claims and herein for interpreting the scope of the invention.

BRIEF DESCRIPTION OF THE DRAWINGS

Like reference numerals will be used to refer to like parts from Figure to Figure in the following description of the drawings.

DETAILED DESCRIPTION OF THE INVENTION

The invention provides a solution target for production of a radionuclide from a target material. The solution target comprises a target body including a target cavity for receiving the target material; a housing defining a passageway for directing a particle beam (e.g., protons) at the target cavity; a target window foil for covering an opening of the target cavity; and a coolant flow path disposed in the passageway upstream of the target window. By "upstream", we mean situated in the opposite direction from that in which the particle beam flows. The coolant flow path can decrease an energy value of the particle beam to 15 MeV or less. The solution target may include an energy degrading foil disposed within the passageway and upstream of the coolant flow path. The energy degrading foil may comprise a cobalt alloy. The target window foil may comprise an aluminum alloy.

The solution target may comprise a target solution port in fluid communication with the target cavity. The solution target may further comprise a pressure source in fluid communication with the target cavity. The pressure source may comprise helium gas. The coolant flow path may comprise helium gas, and the helium gas may be confined in a tubular conduit.

In the solution target, the target body may further include a second coolant flow path disposed adjacent to the target cavity. The second coolant flow path is defined by a space between a first target body component and a second target body component. The second coolant flow path may comprises water. The target cavity may defined by a conical wall. The target material may comprise a solution of a metal.

Figure 1A:
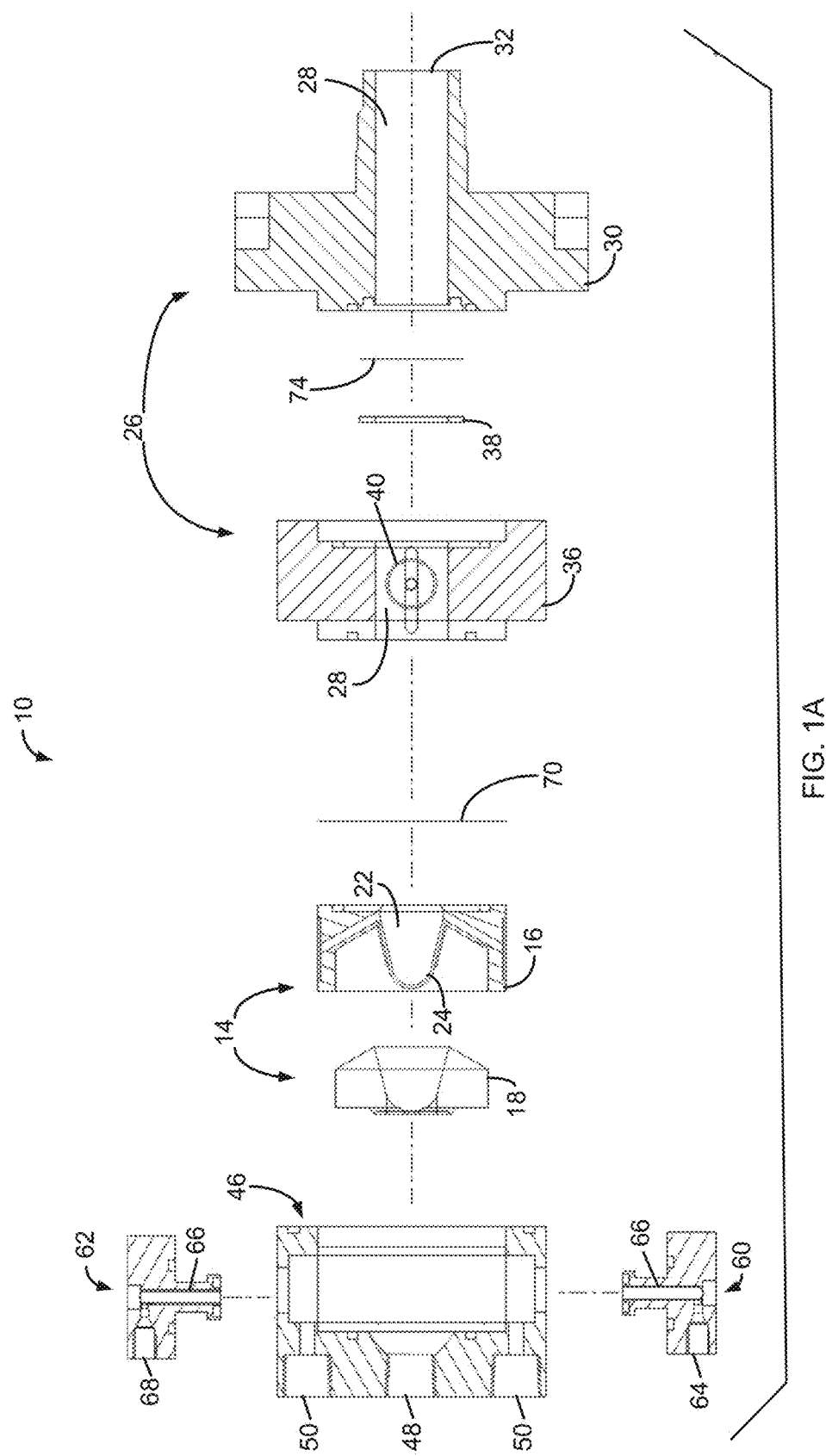
FIG. 1A is an exploded cross-sectional view of a solution target for production of a radionuclide from a target material according to one embodiment of the present invention.
Figure 1B:
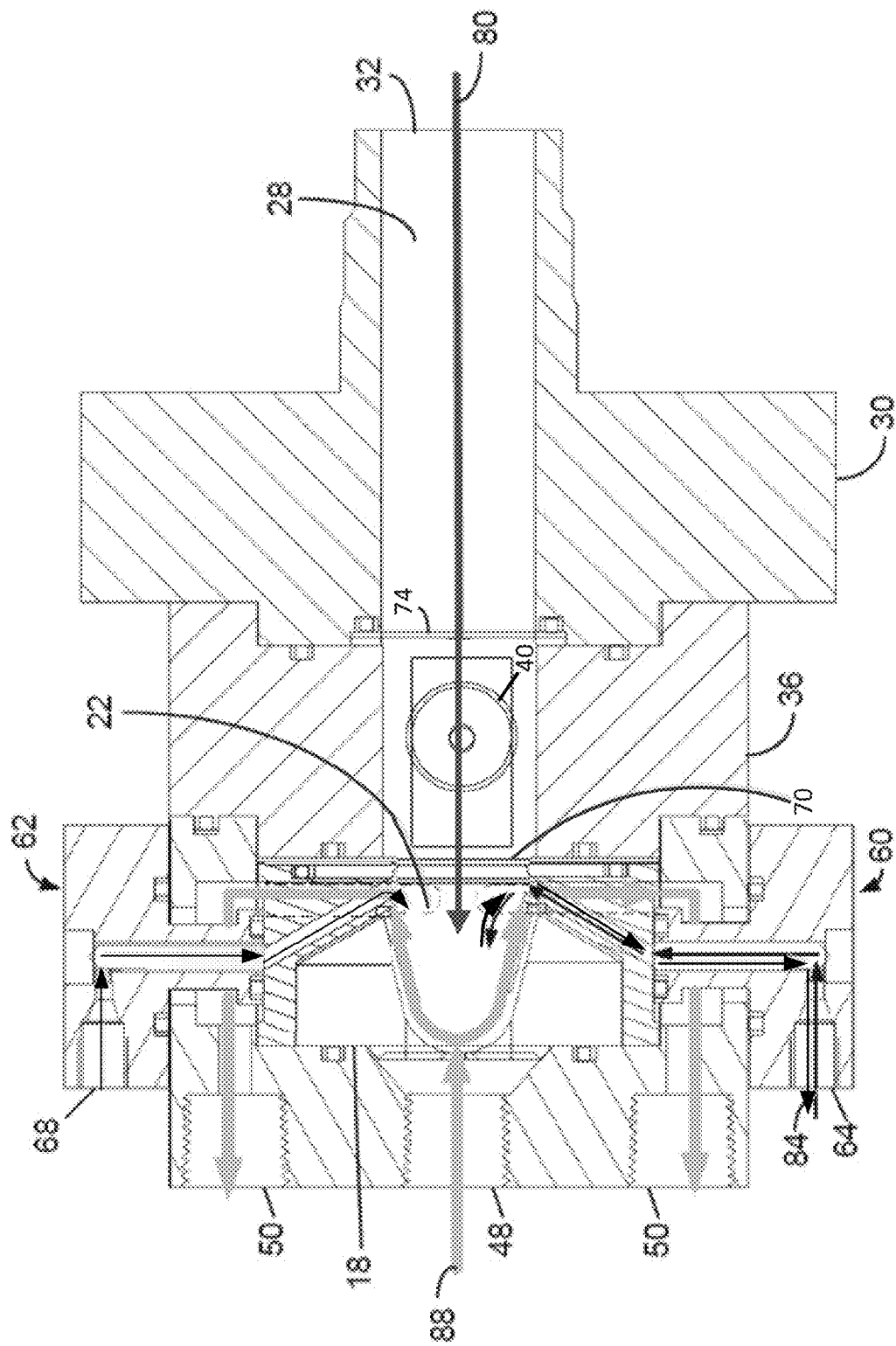
FIG. 1B is a cross-sectional view of the solution target of FIG. 1A in an assembled state.

Referring to FIG. 1A and FIG. 1B, a solution target 10 according to one non-limiting embodiment of the invention is shown. The solution target 10 includes a target body 14 having a first target body component 16 and a second target body component 18. A target cavity 22 is defined by a wall 24 and is disposed within the first target body component 16. The target cavity 22 is configured to receive a target material (e.g. a target solution). In some forms, the wall 24 of the target cavity 22 may be a conical wall. The wall 24 may comprise tantalum or niobium.

The solution target 10 further includes a housing 26 configured to define a passageway 28 for a particle beam (e.g., a proton beam). The housing 26 may include a first housing section 30 having an inlet 32 for the particle beam and a portion of the passageway 28 disposed within. A second housing section 36 is spaced between the first housing section 30 and the first target body component 16 and includes a second portion of the passageway 28. A sealing member 38, for example an O-ring, can be disposed between the first housing section 30 and the section housing section 36 to provide a sealed housing 26.

A coolant flow path 40 is disposed within the second portion of the passageway 28. The coolant flow path 40 can be confined within a tubular structure, such that the particle beam flows around the tubular structure. The coolant flow path 40 may be a helium cooling system configured to degrade the energy of the particle beam to 15 MeV or less.

The solution target 10 further includes a coolant housing 46 configured to define a second coolant flow path. The coolant housing 46 includes an inlet 48 configured to receive a coolant, for example, water. Additionally, the coolant housing 46 includes two outlets 50 configured to expel the coolant.

The solution target 10 further includes a first material housing component 60 and a second material housing component 62. A target material inlet 64 is disposed within the first material housing component 60 and is in fluid communication with a target material passageway 66 and the target body cavity 16. An overpressure source 68 is disposed within the second material housing component 62 and is in fluid communication with the target material passageway 66 and the target body cavity 16.

The solution target 10 further includes a target window foil 70 disposed between the second housing section 36 and the target body 14. The target window beam entry foil 70 is configured to cover an opening of the target body cavity 16. The target window foil 70 may include a cobalt alloy, and may be configured to degrade the energy of the particle beam. In one example, the target window foil 70 is Havar®. Havar® is a heat treatable cobalt base alloy that provides very high strength, such as an ultimate tensile strength of 330,000 psi when cold rolled and heat treated. The alloy provides excellent corrosion resistance and is non-magnetic. The nominal composition is: cobalt 42.0%, chromium 19.5%, nickel 12.7%, tungsten 2.7%, molybdenum 2.2%, manganese 1.6%, carbon 0.2%. and balance iron.

In some forms, an energy degrading foil 74 may be disposed within the passageway 28 and between the first housing section 30 and a second housing section 36. The energy degrading foil 74 may be a metallic foil, for example an aluminum or aluminum alloy foil.

In operation, the particle beam (e.g., proton beam) is introduced into the passageway 28 through the inlet 32. The particle beam follows a particle beam path 80 through the first housing section 32 and the energy degrading foil 74. The partial beam 80 continues through the coolant flow path 40 and through the target window foil 70 into the target cavity 22.

The target material (e.g., a solution of a metal) is introduced into the target material inlet 64 and follows a target material path 84 through the target material passageway and into the target cavity 22. The target material disposed within the target cavity 22 is bombarded with the particle beam to create a radionuclide. The bombarded target material may be removed using material path 84.

A coolant is introduced from a source of coolant (e.g. water) into the coolant housing 46 via the inlet 48. The coolant follows a coolant path 88 from the inlet 48 into a space between the first target body component 16 and the second target body component 18. The coolant path 88 travels adjacent to the wall 24 of the target cavity 22 and through the coolant housing 46 to the two outlets 50.

The invention further provides a solution target system for production of a radionuclide from a target solution. The solution target system includes a target body including a target cavity; a housing defining a passageway for directing a particle beam at the target cavity; a target solution distribution valve in fluid communication with the target cavity; a first source of a first target solution wherein the first source is in fluid communication with the target solution distribution valve; and a second source of a second target solution, wherein the second source is in fluid communication with the target solution distribution valve. The target solution distribution valve is movable from a first distribution position in which the first target solution flows into the target cavity to a second distribution position in which the second target solution flows into the target cavity.

The solution target system may further include a target loading/unloading valve in fluid communication with the target solution distribution valve and the target cavity, wherein the target loading/unloading valve is movable from a first loading position in which at least one of the first target solution and the second target solution flows into the target cavity and a second unloading position in which a radionuclide solution flows from the target cavity to a collection vessel. The solution target system may further include an injection valve in fluid communication with the target solution distribution valve and the target cavity, wherein the injection valve holds a sample of at least one of the first target solution and the second target solution before the sample flows into the target cavity. The solution target system may further include a source of pressurized gas in gas communication with the top entry (62) to target cavity. The solution target system may further include a pressurized gas delivery valve in gas communication with the source of pressurized gas and the target cavity, wherein the pressurized gas delivery valve controls delivery of pressurized gas to the target cavity. The solution target system may further include a pressure regulating valve in gas communication with the target cavity, wherein the pressure regulating valve controls entry of pressurized gas into the target cavity. The solution target system may further include a pressure monitor in gas communication with the target cavity, wherein the pressure monitor provides a means to measure pressure within the target and may also be used to control the pressure regulating valve.

In the solution target system, a target window foil may cover an opening of the target cavity; and a coolant gas flow path may be disposed in the passageway upstream of the target window. An energy degrading foil may be disposed within the passageway and upstream of the coolant flow path.

The first target solution may comprise a first solution of a metal and the second target solution may comprise a second solution of a metal wherein the first solution of a metal is different from the second solution of a metal.

The solution target system may further include one or more additional sources of an additional target solution. Each of the additional sources is in fluid communication with the target solution distribution valve. The target solution distribution valve is movable to one or more additional distribution positions in which each of the additional target solutions flows into the target cavity.

The invention further provides a method for producing a solution including a radionuclide. The method includes the step of bombarding a target solution with protons to produce a solution including a radionuclide, wherein the radionuclide is selected from $^{68}$Ga, $^{89}$Zr, $^{64}$Cu, $^{63}$Zn, $^{86}$Y, $^{61}$Cu, $^{99m}$Tc, $^{45}$Yi, $^{13}$N, $^{52}$Mn, and $^{44}$Sc. The target solution may be bombarded with protons in a target cavity of a solution target operating as a closed system. The method does not include a target dissolution step. The target cavity may be cooled with a coolant during the bombardment. The target cavity is maintained at a pressure below 150 psi. or below 75 psi, during the bombardment. The solution target may have a volume capacity of two milliliters or less. The target cavity may be defined by a generally conical wall and a target window foil.

In one version of the method, the target solution is yttrium nitrate and the radionuclide is $^{89}$Zr. In another version of the method, the target solution is $^{68}$Zn-enriched zinc nitrate and the radionuclide is $^{68}$Ga. In another version of the method, the target solution comprises $^{63}$Cu-enriched copper (II) nitrate and the radionuclide is $^{63}$Zn. In another version of the method, the target solution comprises $^{86}$Sr-enriched strontium nitrate and the radionuclide is $^{86}$Y. In another version of the method, the target solution comprises $^{64}$Ni-enriched nickel nitrate and the radionuclide is $^{64}$Cu. In another version of the method, the target solution comprises scandium nitrate and the radionuclide is $^{45}$Ti. In another version of the method, the target solution comprises $^{52}$Cr-enriched or natural chromium nitrate and the radionuclide is $^{52}$Mn. In another version of the method, the target solution comprises $^{44}$Ca-enriched or natural calcium nitrate and the radionuclide is $^{44}$Sc. In another version of the method, the target solution comprises $^{61}$Ni-enriched or natural nickel nitrate and the radionuclide is $^{61}$Cu via deuteron irradiation. The target solution may further comprise a dilute solution of nitric acid. The concentration of nitric acid in the target solution may be 0.001 M to 2.5 M, or 0.2 to 2 M. In another version of the method, the target solution comprises aqueous ethanol and the radionuclide is $^{13}$N.

The method may further include the steps of passing the solution including the radionuclide through a column including a sorbent to adsorb the radionuclide on the sorbent; and eluting the radionuclide off the sorbent. The term "column", as used herein, refers to a separation technique in which the stationary bed is within a cartridge. The particles of the solid stationary phase or the support coated with a liquid stationary phase, such as resin or sorbent, may fill the whole inside volume of the cartridge (packed column) or be concentrated on or along the inside cartridge wall leaving an open, unrestricted path for the mobile phase in the middle part of the cartridge (open tubular column). Differences in rates of movement through the medium are calculated to different retention times of the sample.

The radionuclidic purity of the radionuclide can be greater than 99%, preferably greater than 99.9%, after eluting the radionuclide off the sorbent. The method may further include the step of passing the eluted radionuclide through a second column including a sorbent.

The invention further provides a disposable, single-use kit for isolation of a radionuclide from a solution including the radionuclide wherein the solution is produced by bombarding a target material in a target cavity of a solution target with protons. The kit includes a chromatographic column including a sorbent to adsorb the radionuclide on the sorbent, wherein the radionuclide is $^{68}$Ga, $^{89}$Zr, $^{64}$Cu, $^{86}$Y, $^{63}$Zn, $^{61}$Cu, $^{99m}$Tc, $^{45}$Ti, $^{52}$Mn or $^{44}$Sc. In one form, the sorbent comprises a hydroxamate resin. The kit may include an eluent for eluting the radionuclide off the sorbent. The eluent may comprise a phosphate. The kit may include a radionuclide product vessel for receiving eluted radionuclide from the column. The kit may include a first fluid conduit for placing the column in fluid communication with the target cavity, and a second fluid conduit for placing the column in fluid communication with the radionuclide product vessel. The kit may include a second chromatographic column including a sorbent to adsorb impurities in an eluent used for eluted radionuclide from the column.

The invention further provides a synthesis system that employs the kit of the invention for performing the process of isolation of the radionuclide from the solution. The synthesis system may be automated using a controller. The controller can execute a stored program to: (i) deliver the solution including the radionuclide from the target cavity to a collection vessel, (ii) deliver the solution including the radionuclide from the collection vessel to the column, (iii) thereafter deliver an eluent to the column, and (iv) thereafter deliver the eluted radionuclide to a radionuclide product vessel.

EXAMPLES

The following Examples are provided in order to demonstrate and further illustrate certain embodiments and aspects of the present invention and are not to be construed as limiting the scope of the invention.

Example 1

Cyclotron Production of $^{68}$Ga Via the $^{68}$Zn(p,n)$^{68}$Ga Reaction in Aqueous Solution Overview of Example 1

Example 1 extends the applicability of the solution target approach to the production of $^{68}$Ga using a low energy (<20 MeV) cyclotron. Since the developed method does not require solid target infrastructure, it offers a convenient alternative to $^{68}$Ge/$^{68}$Ga generators for the routine production of $^{68}$Ga. A new solution target with enhanced heat exchange capacity was designed and utilized in Example 1 with dual foils of aluminum (0.20 mm.) and Havar® cobalt alloy (0.038 mm.) separated by helium cooling to degrade the proton energy to ~14 MeV. The water-cooled solution target insert was made of tantalum and its solution holding capacity (1.6 mL) was reduced to enhance heat transfer. An isotopically enriched (99.23%) 1.7 M solution of $^{68}$Zn nitrate in 0.2 N nitric acid was utilized in a closed target system. After a 30 minute irradiation at 20 µA, the target solution was unloaded to a receiving vessel and the target was rinsed with 1.6 mL water, which was combined with the target solution. An automated module was used to pass the solution through a cation-exchange column (AG-50W-X8, 200-400 mesh, hydrogen form) which efficiently trapped zinc and gallium isotopes. $^{68}$Zn was subsequently eluted with 30 mL of 0.5 N HBr formulated in 80% acetone without any measurable loss of $^{68}$Ga. $^{68}$Ga was eluted with 7 mL of 3 N HCl solution with 92-96% elution efficiency. The radionuclidic purity was determined using an HPGe detector. Additionally, ICP-MS was employed to analyze for non-radioactive metal contaminants. The product yield was 192.5±11.0 MBq/µ·h decay-corrected to EOB with a total processing time of 60-80 minutes. The radionuclidic purity of $^{68}$Ga was found to be >99.9%, with the predominant contaminant being $^{67}$Ga. The ICP-MS analysis showed small quantities of Ga, Fe, Cu, Ni and Zn in the final product, with $^{68}$Ga specific activity of 5.20-6.27 GBq/µg. Depending upon the user requirements, $^{68}$Ga production yield can be further enhanced by increasing the $^{68}$Zn concentration in the target solution and extending the irradiation time. In summary, a simple and efficient method of $^{68}$Ga production was developed using low energy cyclotron and a solution target. The developed methodology offers a cost-effective alternative to the $^{68}$Ge/$^{68}$Ga generators for the production of $^{68}$Ga.

Introduction to Example 1

Our initial attempts to reproduce the solution target method described by Jensen et al. [15] showed that irradiation of aqueous $^{68}$ZnCl$_2$ solutions resulted in rapid pressure increase due to radiolysis-mediated release of hydrogen and oxygen. Additionally, we noticed a pinhole in the Havar® cobalt alloy target window foil, which may be related to a reaction of the Havar® cobalt alloy foil and with the ZnCl$_2$ solution. We have recently performed an extensive study on the mechanistic aspects of water radiolysis during production of $^{89}$Zr in a solution target [Ref. 16-17]. This study showed that the use of nitrate salts in dilute nitric acid solutions dramatically decreased rates of water radiolysis during radiometal production [Ref. 17]. Eliminating the use of ZnCl$_2$ could also prolong the life of the Havar® cobalt alloy foil. In the present work of Example 1, we extended our solution target approach to the production of $^{68}$Ga using a 1.7 M solution of zinc nitrate (isotopically enriched) in 0.2N nitric acid for the production of $^{68}$Ga in a closed solution target system using 20 µA beam current over 30 minute proton irradiation. We also report, an automated separation of $^{68}$Ga from $^{68}$Zn using cation-exchange resin.

Materials and Methods for Example 1

Targetry Details

In this study we designed and developed a new solution target having reduced solution capacity (1.6 mL) with a tantalum target body insert having dual foils of aluminum (0.20 mm) and Havar® cobalt alloy (0.038 mm) separated by helium cooling to degrade the proton energy to ~14 MeV. The new conical shape target showed enhanced heat exchange capacity, resulting in reduced gas formation during irradiation that enabled it to be run as a closed system, pressurized at ~40 psi with oxygen. The design of the target is depicted in FIGS. 1A and 1B and was described above. A semi-automated target loading and unloading system was utilized as described in our previous study [Ref. 17]. In this study of Example 1, 30-minute irradiations were performed with 1.7 M solutions of $^{68}$Zn nitrate (99.23% isotopic enrichment) in 0.2 N nitric acid. The proton beam current was 20 µA.

Chemicals

Zn-68 (99.23%) enriched metal was purchased from Cambridge Isotopes Laboratory (Tewksbury, Mass., USA). Hydrochloric acid (34-37% as HCl) and nitric acid (67-70% as $HNO_3$) both trace metal basis were purchased from Fisher Scientific (Suwanee, Ga., USA). Hydrobromic acid (48% as HBr) and acetone were purchased from Sigma-Aldrich (St. Louis, Mo., USA). AG-50W-X8 and Chelex-100 (50-100 mesh sodium form) resins were purchased from Bio-Rad (Hercules, Calif., USA).

Instrumentation

High-purity germanium gamma spectrometer (Canberra, Meriden, Conn., USA) counters running Genie 2000 software was utilized to measure the radionuclide purity. The activity readings were measured using a CRC dose calibrator (#416 setting, CRC-55tPET, Capintec, Ramsey, N.J., USA). A Dionex cation analysis HPLC system equipped with an IonPac CSSA analytical column (4×250 mm, Dionex) and in-line radioactivity detector (Carroll and Ramsey Associates, Berkeley Calif., USA) was employed to analyze for non-radioactive metal contaminants. The flow rate of mobile phase (Dionex MetPac Eluent) was 1.2 mL/min. For anion analysis, a Dionex ICS-2100 Ion Chromatography System by Thermo Scientific was used, employing an IonPac AS19 analytical column with ion suppression, and mobile phase of 70 mM KOH. A Perkin Elmer ELAN DRC II ICP mass spectrometer by Perkin Elmer was also employed to measure trace metal contaminants.

Figure 2:
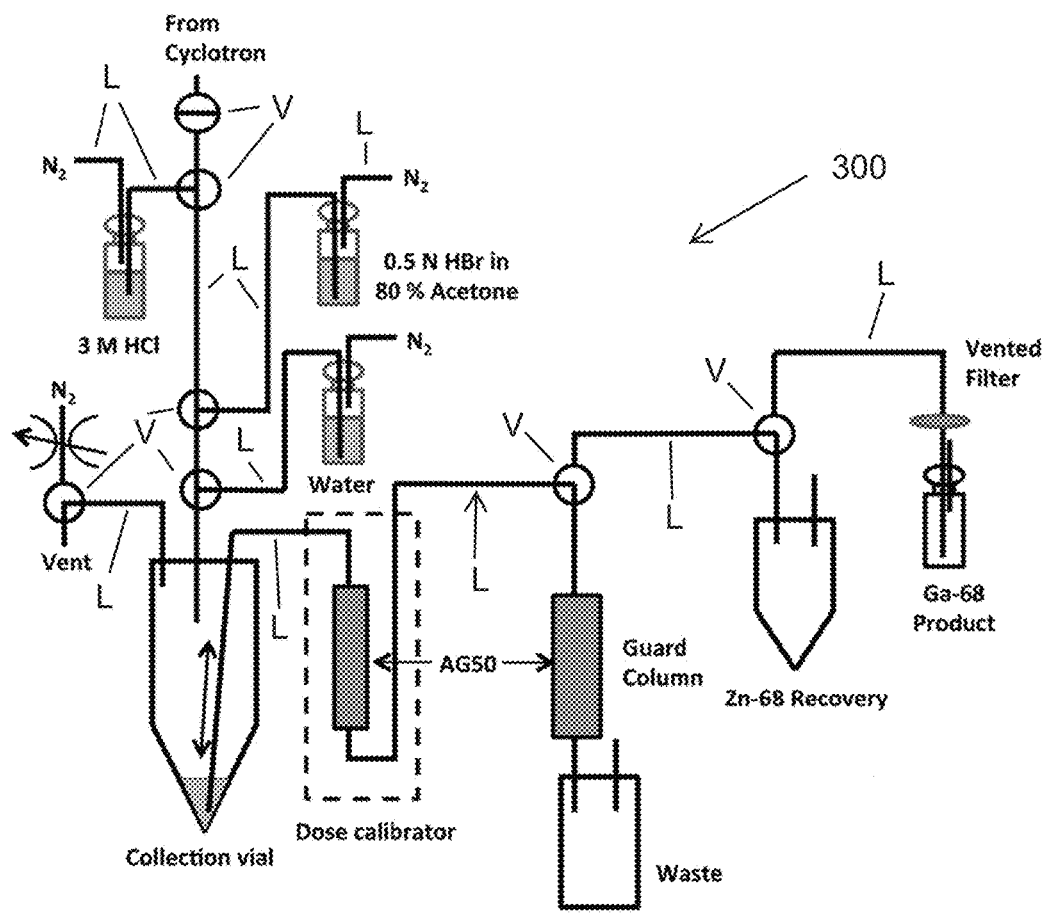
FIG. 2 is a schematic of an automated system for the separation of $^{68}$Ga radioisotope from a $^{68}$Zn(NO$_3$)$_2$ target solution.

Method for $^{68}$Ga Separation, Determination of Specific Activity and Recovery of $^{68}$Zn(NO$_3$)$_2$ Separation of $^{68}$Ga from $^{68}$Zn(NO$_3$)$_2$:

An in-house built automated system was developed for the separation of $^{68}$Ga radioisotope from the $^{68}$Zn(NO$_3$)$_2$ target solution as outlined in FIG. 2. After irradiation, the target dump (1.6 mL) was received in a collection vial along with a 1.6 mL water rinse of the target. The rinse and dump solutions were mixed and passed through a cation-exchange column (AG-50W-X8, 1.3 g, 200-400 mesh, hydrogen form), which was pre-conditioned by washing with 15 mL of water followed by air. Both $^{68}$Ga and $^{68}$Zn were effectively trapped on the cation exchange column. After trapping, the column was washed with 5.0 mL of water (chelexed water to avoid any metal contamination) to remove short-lived $^{11}$C and $^{13}$N isotopes. A cation-exchange guard column (AG-50W-X8, 5.0 g, 200-400 mesh, hydrogen form) was placed before the waste bottle to trap any potential breakthrough of $^{68}$Zn during purification. The cation-exchange column was placed inside the dose calibrator to monitor the total radioactivity trapped on the column. A programmable microprocessor-based controller can be in electrical communication with the valves V of the system 300 of FIG. 2 to open and close the valves when necessary to transfer fluids in the fluid lines L of FIG. 2. Suitable timing of valve opening and closing can be programmed in the controller.

Zinc-68 was eluted from the column using 30 mL of 0.5 N HBr in 80% acetone solution and collected in a separate recovery vial followed by a 3 mL water rinse to remove any remaining HBr-acetone. Finally, $^{68}$Ga was eluted with 3 N HCl (7 mL) to a product vial.

Recovery of $^{68}$Zn(NO$_3$)$_2$ after irradiation was achieved by evaporating the 0.5 N HBr in 80% acetone solution to dryness using a rotary evaporator followed by re-dissolving the residue in concentrated nitric acid (3-5 mL) and evaporating to dryness again on the rotary evaporator. This process was repeated a total of three times to ensure the complete conversion of $^{68}$Zn to $^{68}$Zn(NO$_3$)$_2$. After conversion, the identity of anionic species was confirmed as nitrate using an HPLC anion chromatography method (Dionex ICS-2100 Ion Chromatography System). The HPLC method did not show the presence of any other anion. The obtained salt was still a viscous material, which on freeze-drying obtained as a solid.

Specific Activity and Trace Metal Analysis

Specific activity (GBq/µg) of $^{68}$Ga was measured by estimating the total Ga metal present in the final product after purification. The other metal contaminants including Zn, Fe, Cu, Ni, and Ga were also analyzed using an ICP-mass spectrometer.

Measurement of Radionuclide Purity

For the measurement of radionuclidic purity we used a gamma ray spectrometer (Canberra, Meriden, Conn., USA, DSA1000) equipped with a high-purity germanium (HPGe) detector.

Results and Discussion for Example 1

Initial Experiments, Separation and Automation

Based on the preliminary study by Jensen et al [Ref. 15], our first irradiations used 1.7 M $^{68}$ZnCl$_2$ in the solution target system. At a beam current of 20 pA, the target pressure rose rapidly to >150 psi within 5 minutes, and the run had to be aborted. This result was not surprising, as we had observed similar results in our previous studies with yttrium chloride [Ref. 16]. Based on our previous results, we switched to $^{68}$Zn(NO$_3$)$_2$ in 0.2 N nitric acid solution, pressurized with oxygen at ~40 psi. Furthermore, due to the enhanced cooling of the new target design, the target was operated as a closed system. Under these conditions, the target was irradiated for 30 minutes at 20 µA. The in-target pressure was maintained below 100 psi over the run.

To accomplish the separation of $^{68}$Ga from $^{68}$Zn, we modified the cation-exchange method developed by Strelow [Ref. 18] in the early 1980s for the separation of non-radioactive Ga salts from zinc and other metal salts. A column of 1.3 g of AG-50W-X8 resin was used. $^{68}$Ga was trapped at more than 99% efficiency. We did not observe loss of $^{68}$Ga during the elution of $^{68}$Zn with 0.5 N HBr in 80% acetone or during subsequent rinsing of the column with water. Finally, $^{68}$Ga was eluted using 3 N HCl solution (7 mL) with 92-96% elution efficiency. The elution efficiency can be increased by increasing the amount of 3 N HCl solution, but at the cost of increasing the volume of acid in the subsequent processing steps. The isotope separation process was automated using an in-house radiochemistry module with actuated valves.

Production conditions of the solution target were 1.7 M $^{68}Zn(NO_3)_2$ in 0.2 N $HNO_3$ solution at 20 µA beam current over a 30 minute irradiation. The production yield of $^{68}Ga$ was found to be 192.5±11.0 MBq/µA·h after isotope separation having specific activity in the range of 5.20-6.27 GBq/µg (see Table 1). These values are decay-corrected to end of bombardment (EOB).

TABLE 1

Yields of $^{68}Ga$ in solution target (n = 3)

| Uncorrected Yield (GBq) | Corrected Yield (GBq) | Yield (MBq/ µA · h) | Specific activity (GBq/µg) | Specific activity (mCi/µg) | ICP-MS determined quantities of Ga and other trace metals in product* (µg, n = 2) |
|---|---|---|---|---|---|
| 0.96 ± 0.10 | 1.93 ± 0.11 | 192.5 ± 11.0 | 5.20-6.27 | 140-169 | Ga (0.32, 0.39), Fe (17.0, 95.1), Cu (51.4, 12.6), Ni (3.5. 33.7), Zn (1.9. 1.9) |

*these amounts were estimated for the total 7 mL of the product solution.

Figure 3:
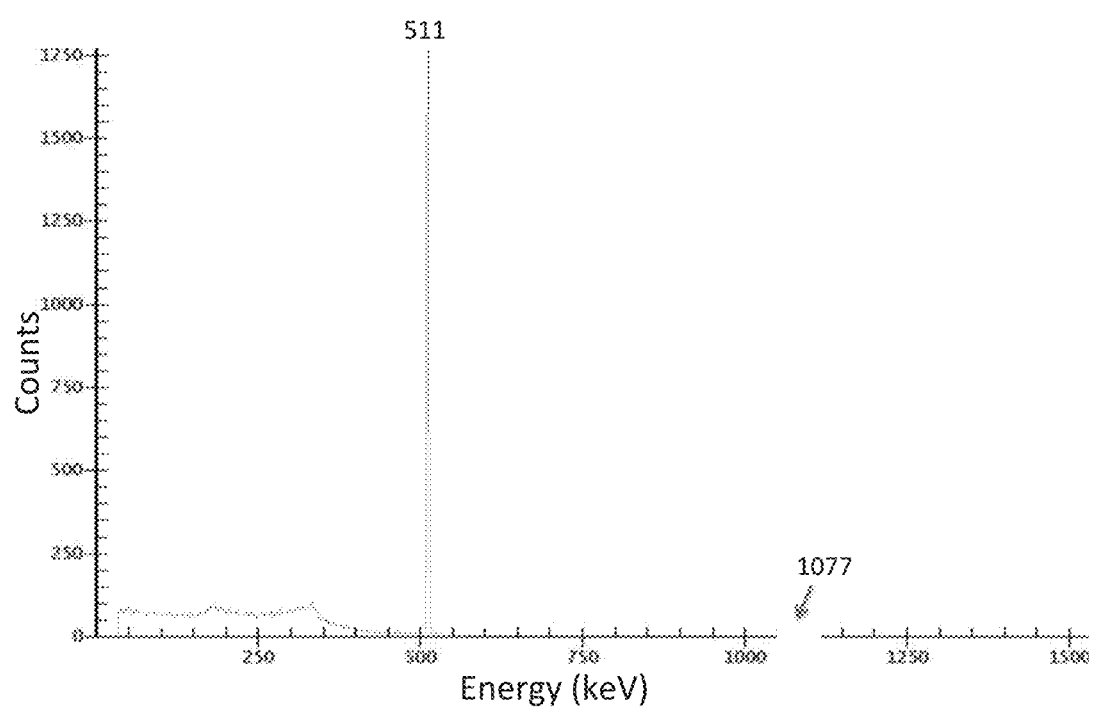
FIG. 3 is a plot showing the radionuclidic purity of $^{68}$Ga two hours after end of bombardment (EOB).
Figure 4:
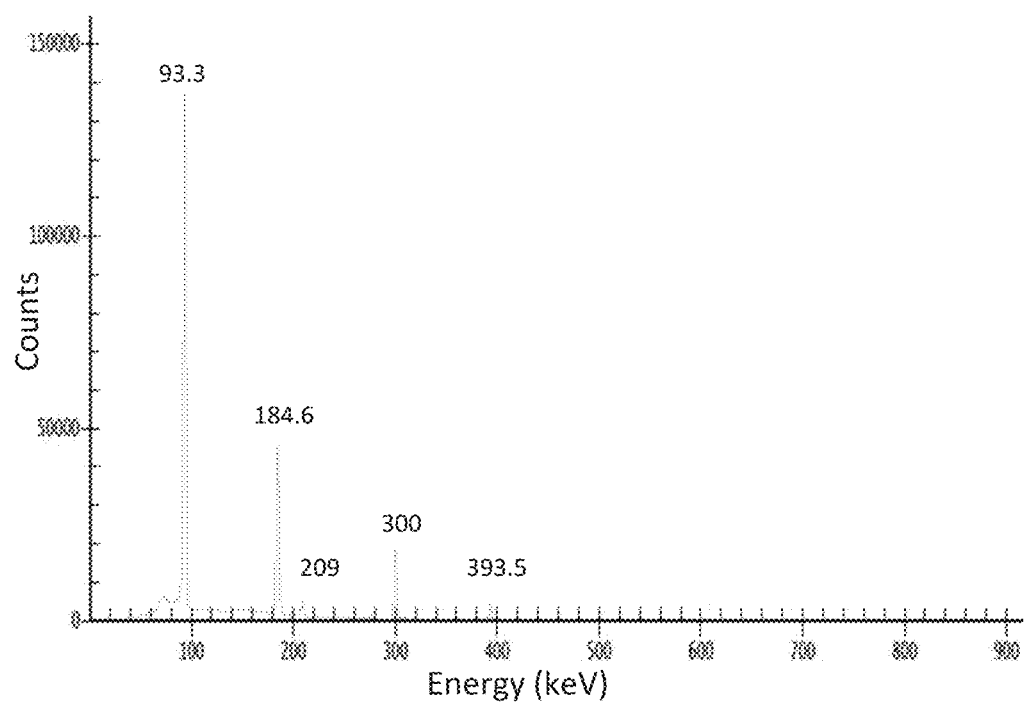
FIG. 4 is a plot showing the radionuclidic purity of $^{68}$Ga thirty-six hours after EOB.
Figure 5:
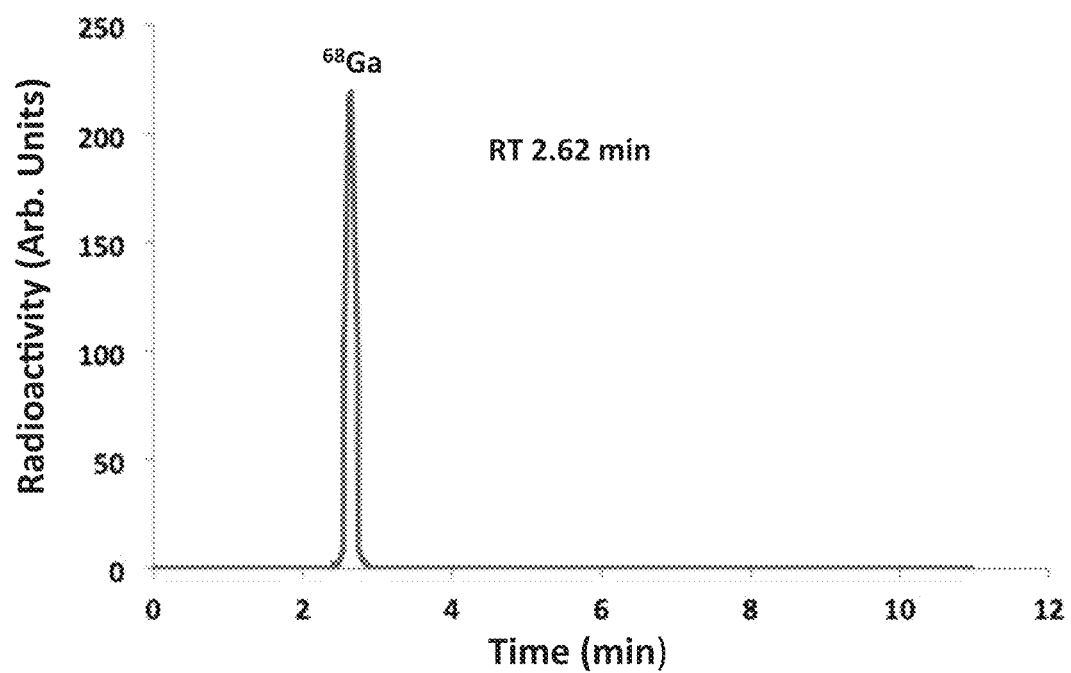
FIG. 5 is an HPLC chromatogram of purified $^{68}$Ga, with retention time of 2.62 minutes.

At 2 hours after EOB, a purified sample of $^{68}Ga$ was subjected to HPGe spectrometry and only two peaks were evident, at 511 keV and 1077 keV both corresponding to $^{68}Ga$. Therefore, the radionuclidic purity of $^{68}Ga$ was >99.9% (see FIG. 3). However, when same sample was reanalyzed 36 hours after EOB additional peaks were observed corresponding $^{67}Ga$, which on decay correction to EOB, was estimated to be <0.07% of the total $^{68}Ga$ (see FIG. 4). The Ga-67 emissions were predominated by the Ga-68 emissions at 2 hours after EOB. The presence of $^{67}Ga$ impurity can be attributed to two possible nuclear reactions: $^{68}Zn(p,2n)^{67}Ga$ and $^{67}Zn(p,n)yGa$ [Ref. 19, 20]. We would anticipate ~0.1% $^{67}Ga$ impurity in the $^{68}Ga$ product for a 60 minute irradiation. Radiochemical purity, as measured by cation-exchange HPLC, was >99.9% (see FIG. 5).

The saturation yields for $^{68}Ga$ before and after the separation of isotopes were found to be 0.43±0.01 GBq/µA and 0.36±0.02 GBq/µA, respectively (see Table 2). We attempted to make a comparison with the saturation yield using the solid target method as reported by Sadeghi et al [Ref. 11]. These authors reported production yield as 5.032 GBq/µA·h, presumably without taking the isotope separation into consideration. The calculated saturation yield from their data is 35.3 GBq/µA. Thus, our yields were approximately 83 times less than the solid target yields. However, Sadeghi et al [Ref. 11] did not specify the time of isotope separation so we cannot compare isolated product yields. We would anticipate that the comparison of isolated yields would be somewhat more favorable for the solution target method because it does not require a target dissolution step.

TABLE 2

Saturation yields of $^{68}Ga$*

| Before separation (mCi/µA) | Before separation (GBq/µA)) | After separation (mCi/µA) | After separation (GBq/µA) |
|---|---|---|---|
| 11.5 ± 2.8 | 0.43 ± 0.01 | 9.8 ± 0.57 | 0.36-0.02 |

*n = 3 and all values decay corrected to EOB.

Considering that the primary end-use of the $^{68}Ga$ would be in for labeling of molecular targeted peptides, we also analyzed for the presence of trace metal contamination in the final product using ICP-MS. Although very low quantities of Ga were found (0.32-0.39 µg), relatively higher amounts of Fe, Cu and Ni were observed (see Table 1). If necessary, these contaminants can be further reduced before labeling using $SnCl_2/TiCl_3$ and Amberchrom CG-161m resin as described by Van der Meulen et al [Ref. 21]. Furthermore, in order to achieve the optimum labeling conditions (pH) for various chelators, the final $^{68}Ga$ solution (7 mL, 3 N HCl) can be concentrated using an anion-exchange column, where $[^{68}GaCl_4]^-$ will be effectively trapped and can be further eluted with water as previously described [Ref. 1, 22]. The final pH can be readjusted using the buffer required to meet the labeling conditions. We estimate the cost of a single dose (370 MBq) of the $^{68}Ga$ produced from a cyclotron using the $^{68}Zn(NO_3)_2$ in 0.2 N $HNO_3$ solution target method to be $20-25 assuming 85-90% recovery of $^{68}Zn$, which we found in our initial attempts.

The unoptimized separation time was in the range of 60-80 minutes, but we would anticipate reduction of this time to ~45 min with further development. We were able to make ~25 mCi (0.92 GBq)$^{68}Ga$ at end of separation. By increasing $^{68}Zn$ nitrate concentration (2×) and beam current (2×), we anticipate that >100 mCi (3.7 GBq) can be practically achieved. This would serve the need for 2-4 subjects, depending on labeling yields.

Conclusions for Example 1

A solution target approach for production and automated separation of $^{68}Ga$ was successfully developed employing a solution of $^{68}Zn$ nitrate in 0.2 N nitric acid. The production yield was found to be 192.5±11.0 MBq/µA·h decay-corrected to EOB with a specific activity in the range 5.20-6.27 GBq/µg. Radiochemical and radionuclidic purities were both >99.9%. Increasing the target solution concentration of $^{68}Zn$ and irradiation time may further increase the production yield. The isotope separation method employed AG 50W-X8 resin eluted with a solution of 0.5 N HBr in 80% acetone to remove the zinc isotopes, followed by elution of $^{68}Ga$ in 3 N HCl. The new target design with reduced target volume (1.6 mL) and enhanced heat transfer allowed irradiation as a closed system. Gallium-68 can, therefore, be produced on a low energy cyclotron in sufficient quantities to provide a viable alternative to the $^{68}Ge/^{68}Ga$ generator for those facilities that have an on-site cyclotron.

Example 2

Summary of Example 2

The existing solid target production method of radiometals requires high capital and operational expenditures, which limit the production of radiometals to the small fraction of cyclotron facilities that are equipped with solid target systems. In Example 2, we develop a robust solution target method, which can be applicable to a wide array of radiometals and would be simply and easily adopted by existing cyclotron facilities for the routine production of radiometals.

We have developed a simplified, solution target approach for production of $^{89}$Zr using a niobium target by 14 MeV energy proton bombardment of aqueous solutions of yttrium salts via the $^{89}$Y(p,n)$^{89}$Zr nuclear reaction. The production conditions were developed, following a detailed mechanistic study of the gas evolution.

Although the solution target approach avoided the expense and complication of solid target processing, rapid radiolytic formation of gases in the target represents a major impediment in the success of solution target. To address this challenge we performed a systematic mechanistic study of gas evolution. Gas evolution was found to be predominantly due to decomposition of water to molecular hydrogen and oxygen. The rate of gas evolutions varied >40-fold depending on solution composition even under the same irradiation condition. With chloride salts, the rate of gas evolution increased in the order rank Na<Ca<Y. However, the trend was reversed with the corresponding nitrate salts, and further addition of nitric acid to the irradiating solution minimized gas evolution. At developed condition, $^{89}$Zr was produced in moderate yield (4.36±0.48 MBq/µA·h) and high effective specific activity (464±215 MBq/µg) using the solution target approach (2.75 M yttrium nitrate, 1.5 N HNO$_3$, 2 hours irradiation at 20 µA).

The novel findings of Example 2 on substrate dependent, radiation-induced water decomposition provide fundamental data for the development and optimization of conditions for solution targets. The developed methodology of irradiation of nitrate salts in dilute nitric acid solutions can be translated to the production of a wide array of radiometals like $^{64}$Cu, $^{68}$Ga and $^{86}$Y, and is well suited for short-lived isotopes.

Introduction to Example 2

The PET radioisotope $^{89}$Zr has recently received growing interest due to its good imaging properties (E$_{\beta max}$ 0.9 MeV), and its ease of conjugation to proteins and antibodies using the chelator desferrioxamine [Ref. 23-25]. The close match between the physical half-life and the clearance kinetics of antibodies has created a niche for this isotope [Ref. 26,27]. $^{89}$Zr is commonly produced via the $^{89}$Y (p,n)$^{89}$Zr nuclear reaction wherein Y foils [Ref. 28,29], pellets [Ref. 30], sputtered materials [Ref. 31] or depositions [Ref. 32,33] are irradiated with 12.5-15 MeV protons. The solid target approach entails high capital and operational costs for target processing, limiting the production of this isotope to the small fraction of cyclotron facilities that are equipped with solid target systems. A potential way to avoid use of solid target systems is to develop a solution target method for $^{89}$Zr production. Solution targets are easily filled and unloaded to hot cells via tubing in the same way that $^{18}$F targets are operated. Solution targets have been recently reported for the production of $^{86}$Y, $^{68}$Ga and $^{94m}$Tc [Ref. 34,35].

The major impediment in the development of solution targets is radiolytic formation of gases and subsequent generation of extremely high-pressures in closed target systems during irradiation, a fact previously reported by our group and others [Ref. 34-38]. In most cases, the irradiation times have been limited by this rise in target pressure. We have employed the use of a backpressure regulator to slowly bleed gas from the target system [Ref. 37,38], but this has its drawbacks of potential loss of solution or water vapor from the target, and subverting the recombination of molecular hydrogen and oxygen formed by radiolysis. In Example 2, we investigated the mechanistic basis of the gas formation and how it could be minimized or even overcome to develop a robust solution target for the radiometal production.

For target development, we selected $^{89}$Zr as target isotope based on its level of interest in the imaging community and the affordability of its yttrium reagent materials. We realized that $^{89}$Zr would represent a worst-case scenario for solution target applications because its longer half-life (T$_{1/2}$=78.4 hours) would require long irradiations to produce significant amounts of radiometal and would not compare favorably to solid target production methods. Even so, the low cost for development efforts and the long irradiation requirement for $^{89}$Zr production would provide an appropriate situation to test a solution target for longer irradiations of other interesting isotopes. We anticipated that a production methodology developed for $^{89}$Zr could be translated to other shorter-lived isotopes such as $^{68}$Ga, $^{64}$Cu and $^{86}$Y. In Example 2, we investigated the in target chemistry associated with proton bombardment of aqueous solutions of yttrium salts and developed conditions for $^{89}$Zr production using Y(NO$_3$)$_3$ solutions.

Materials and Methods for Example 2

Targetry Details

Figure 6:
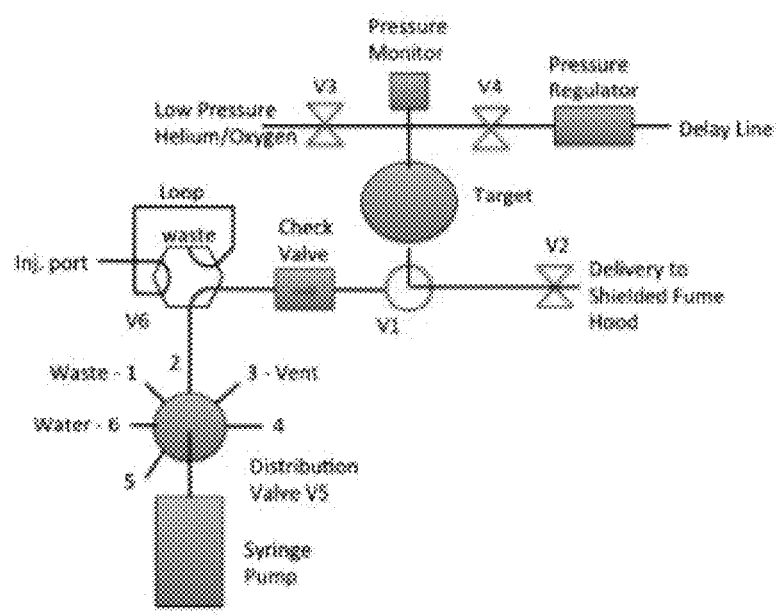
FIG. 6 shows a schematic diagram of $^{89}$Zr production using a remotely controlled loading and unloading system.

A Bruce Technologies (Raleigh, N.C.) TS-1650 target was used (3 mL Nb insert, 0.16 mm Nb window foil) within a PETtrace cyclotron (GE HealthCare, Waukesha, Wis., USA). Incident proton energy to the solutions was ~14 MeV. A semi-automated system was developed for target loading and unloading (see FIG. 6). The system was comprised of a syringe pump, a 2-position injection valve (V6) having a 3 mL loop to hold the target loading solution, and valves that enabled loading (V1) and unloading (V2) of the target. On the top of the target, a common line connected to a pressure monitoring transducer, a low-pressure gas line (helium/oxygen to pressurize the target through pressurized fluid delivery valve V3), and a backpressure regulator (pressure regulating valve V4). The backpressure regulator was further connected to a delay line within the cyclotron vault in order to contain radioactive gas emissions. The target of the system of FIG. 6 may be the solution target 10 of FIGS. 1A and 1B with the system of the FIG. 6 being in fluid communication with the target cavity 22 of the solution target 10.

The target was cooled with the standard chilled water system on the PETtrace with incoming water at near room temperature. For mechanistic study, beam current was set at 25 µA and irradiation time was 5 minutes. Only five minute irradiation was chosen for mechanistic study as we found 5 minute time frame was enough to make a significant difference in the rate of gas evolution with different substrates. A backpressure regulator limited target pressure to <60 psi. Evolved target gas volume was measured using a volumetric syringe.

Chemicals

Yttrium nitrate (Y(NO$_3$)$_3$.6H$_2$O) was purchased from Strem Chemicals (Newburyport, Mass., USA). Yttrium chloride (YCl$_3$.6H$_2$O, trace metals basis), oxalic acid dehydrate [TraceSELECT®, ≥99.9999% metals basis] sodium carbonate, sulfanilamide, sodium metabisulfite, guaiacol, triethanolamine and hydrogen peroxide solution (30 wt % in $H_2O$) were purchased from Sigma-Aldrich (St. Louis, Mo., USA). Diethylenetriamine-pentaacetic acid pentasodium salt solution (40% aqueous solution) and 8-Anilino-1-naphthalenesulfonic acid ammonium salt hydrate were purchased from Acros Organics. Hydrochloric acid (34%-37% as HCl) and nitric acid (67%-70% as $HNO_3$) both trace metal basis were purchased from Fisher Scientific (Suwanee, Ga., USA). Chelex-100 resin (50-100 mesh sodium form) was purchased from Bio-Rad. Desferrioxamine mesylate was purchased from EMD Chemicals. i-TLC paper was purchased from Agilent Technologies (Palo Alto, Calif., USA).

Instrumentation

The radioactive samples were analyzed using a Wizard 2480 gamma counter (Perkin Elmer, Waltham, Mass., USA), high-purity germanium gamma spectrometer (Canberra, Meriden, Conn., USA) counter running Genie 2000 software. The activity readings were recorded using a CRC dose calibrator (489 setting, CRC-55tPET, Capintec, Ramsey, N.J.). An Agilent Cary 60 UV-Vis spectrometer was used for light absorption measurements.

Measurement of Rate of Gas Evolution

To maintain a constant target pressure, the gas was expelled through a backpressure regulator (60 PSI, Optimize Technologies, Oregon City, Oreg., USA) and evolved gases were collected in a volumetric syringe placed at the end of the line in a shielded hot shell. To avoid inaccuracies caused by the variable period of beam tuning on the gas evolution, we started the recording of gas volumes after one minute into the irradiation. Rate of gas evolution was averaged over the remainder of the irradiation period.

Synthesis and Characterization of $Y(OH)_3$ by Infra-Red Spectroscopy

Yttrium hydroxide was synthesized by reacting yttrium chloride (3.3 mmol, 1.0 g) in 3.0 mL of water with sodium hydroxide (11.5 mmol, 0.46 g) also in 3.0 mL of water initially at 0° C. for 15 minutes followed by 30 minutes at room temperature. Obtained precipitate was filtered and washed with 30 mL of deionized water to remove sodium chloride, unreacted sodium hydroxide and yttrium chloride. The desired precipitate was further freeze-dried to remove traces of water. FT-IR spectroscopy was performed using a KBr pellet (Thermo-Nicolet 370 FT-IR Avatar).

Method for $^{89}Zr$ Separation and Determination of Specific Activity

Separation of $^{89}Zr$

Separation of $^{89}Zr$ radioisotope from yttrium in irradiated $Y(NO_3)_3$ solutions was achieved by slightly modifying the literature methods [Ref. 31, 39, 40]. After irradiation, target solution mixture was transferred onto a custom-made column consisting of 75 mg of hydroxamate-derivatized resin. The column was activated prior to the loading of $^{89}Zr$ solution by washing with 8 mL of pure acetonitrile optima grade, 15 mL of water (pH=7.0, passed through Chelex-100 resin) and 2 mL of 2 N HCl (trace metal basis grade). The original container of $^{89}Zr$ was washed twice with two 5 mL portions of 2 N hydrochloric acid (trace metal basis) and loaded onto the column to remove any residual traces of $^{89}Zr$. This was followed by washing the column with six times 12 mL portions of 2 N HCl for a total volume of 72 mL, and subsequently washed the column with 20 mL of Chelex-treated water, followed by aspiration to reduce the retained water on the column. Finally, 1.5 mL of 1 M oxalic acid solution (trace metal basis) was used to elute purified $^{89}Zr$ oxalate.

Specific Activity

Specific activity (MBq/µg) of $^{89}Zr$ was measured by adopting the literature methods [Ref. 31, 39, 40], in gist; it was a quantitative estimation of $^{89}Zr$ by titrating $^{89}Zr$-oxalate solution with known quantities of desferrioxamine, prepared by serial dilution. The complexation occurred fairly fast at room temperature within 60 minutes. The relative amounts of free and bounded $^{89}Zr$ were estimated by i-TLC developed in diethylenetriaminepentaacetic acid (DTPA) followed by measuring the relative ratios of γ-emission produced by $^{89}Zr$ in both bounded (complexed) and free form using gamma spectrometer.

Determination of $NO_2$ Content by the TGS Method

To determine the concentration of $NO_2$ in the gas evolved from the irradiated target we utilized the "TGS-method" as adopted by the US Environmental Protection Agency (EPA). It is a colorimetric determination assay initially described by Mulik et al. and others [Ref. 40,42]. The method utilized an $NO_2$ absorption solution that was composed of the following reagents: 2% triethanolamine (w/v); 0.05% guaiacol/o-methoxyphenol (w/v); and 0.25% (w/v) sodium metabisulfite in water. Expelled gas from the solution target was bubbled through 30 mL of the absorption solution kept at 0° C. After completed bubbling and absorption of $NO_2$, the solution was stored at 4° C. overnight for the decay of short lived radioisotopes ($^{11}C$ and $^{13}N$). To 1 mL of the solution was added 100 µl of diluted hydrogen peroxide solution (1 part 30% $H_2O_2$ to 125 parts water), and the solution was mixed well. To this solution, 500 µl of (2.15% (w/v)) sulfanilamide in 10% HCl was added. After vigorous mixing, 600 µl of the coupling reagent (2% (w/v) ammonium 8-anilino-naphthalene sulfonate in water) was added and the solution was mixed thoroughly. Absorbance (550 nm) was determined after letting the mixture stand at room temperature for 1 minute. The absorption solution was used as a blank. Calibration standards for $NO_2$ concentrations were generated by bubbling specific volumes of commercially obtained 0.981% $NO_2$ (Praxair, Rochester, Minn., USA) to 30 mL of absorption solution. Absorbance measurements for the standards defined a linear calibration curve. To determine the effective volume of $NO_2$ released from the target, a linear regression was performed using the calibration data.

Determination of Chlorine ($Cl_2$) Content During $YCl_3$ Irradiation by EMD-Chlorine Kit The efflux gas was bubbled through three 30 mL vials connected in series containing deionized water at 0° C. The solutions were stored at 4° C. overnight for the decay of the short-lived radioisotopes ($^{11}C$ and $^{13}N$). The chlorine concentration (mg/mL) was measured according to the EMD-chlorine kit procedure.

Determination of Hydrogen and Oxygen Content

Evolved target gas was qualitatively analyzed for $H_2$ using a hydrogen detector (SRI Instruments, Torrence, Calif., USA). A Clark-type oxygen probe detector (YSI Instruments, Yellow Springs, Ohio, USA) was used to quantify oxygen content in the evolved target gas. During an irradiation of a solution of 1.7 M $Y(NO_3)_3$ in 1 N $HNO_3$, the evolved target gas was passed through a trap of 1 N NaOH before flowing through a chamber containing the oxygen probe submerged in a minimal volume of water.

Measurement of Radionuclidic Purity

For the measurement of radionuclidic purity we used a high-purity Germanium (HPGe) radiation detection spectrometer (Canberra, Meriden, Conn., USA).

Statistical Analysis

All values are given as mean±standard deviation. Statistical significance of differences in gas evolution rates were determined by two-tailed student's T-test. P values <0.05 were considered statistically significant.

Results and Discussion for Example 2

Initial Experiments and Major Impediments

During initial proton irradiations of aqueous $Y(NO_3)_3$ solutions (0.85-1.7 M), prolonged evolution of gases (>5 ml/min) and in-target precipitation of salts limited irradiations to less than 5 minutes at 25 μA. A backpressure regulator (0.41 MPa) was installed at the headspace of the target to allow release of gases while maintaining target pressure. The infra-red spectrum of the target precipitate was obtained and compared with that of synthesized $Y(OH)_3$. The $Y(OH)_3$ standard sample showed a broad peak at 3445 $cm^{-1}$ that matched with the broad peak at 3495 $cm^{-1}$ from the target precipitate. This confirmed the target precipitate as yttrium hydroxide. The infra-red spectra of $Y(NO_3)_3$ and commercially obtained $Y_2O_3$ were also compared with obtained precipitate but did not match (no OH stretching peak), ruling out the possibility of $Y(NO_3)$ and $Y_2O_3$.

Mechanistic Study to Understand the in-Target Chemistry

We embarked on a mechanistic study of the gas evolution and in-target precipitation that might inform a more optimal production strategy. Irradiation of yttrium nitrate solutions resulted in the evolution of $NO_2$ as predicted from literature studies [Ref. 43,44] (see Table 3). However, only small quantities (<0.1%) of $NO_2$ were found. Irradiation of yttrium chloride solutions resulted in evolution of relatively small (<2.5%) fractions of $Cl_2$ (see Table 4), however total gas evolution dramatically increased (>39 mL/min, see Table 5). Using a hydrogen detector and Clark-type oxygen probe detector, the predominant evolved gases were characterized as $H_2$ and $O_2$, respectively. The hydrogen concentration was not quantified. During an irradiation of 1.7 M $Y(NO_3)_3$ in 1 N $HNO_3$, the evolved target gas was passed through a trap of 1 N NaOH before flowing through a chamber containing the oxygen probe submerged in a minimal volume of water. The oxygen concentration was found to be 33.3%±0.04% as consistent with the stoichiometric decomposition of water to molecular $H_2$ and $O_2$.

TABLE 3

Efflux of $NO_2$ gas at different time intervals during 120 min proton irradiation of 2.75M $Y(NO_3)_3$ solution at 20 μA beam current

| Run | Amount of $NO_2$ evolved 0-30 min (mL) | Amount of $NO_2$ evolved 30-60 min (mL) | Amount of $NO_2$ evolved 60-90 min (mL) | Amount of $NO_2$ 90-120 min (mL) | Total amount of $NO_2$ evolved 0-120 min (mL) | Rate of $NO_2$ evolved (mL/min) | Average ± sd rate of $NO_2$ evolved (mL/min) |
|---|---|---|---|---|---|---|---|
| 1 | 0.52 | 3.40 | 4.90 | 5.42 | 14.26 | 0.118 | 0.093 ± 0.04 |
| 2 | 2.01 | 3.86 | 3.86 | 3.82 | 13.57 | 0.109 | |
| 3 | 0.13 | 0.19 | 0.68 | 4.79 | 5.79 | 0.048 | |

TABLE 4

Estimated chlorine ($Cl_2$) evolution during 5 min $YCl_3$ irradiation.

| Run[a] | Chlorine content in Vial 1 (mg) | Chlorine content in Vial 2 (mg) | Chlorine content in Vial 3 (mg) | Total Chlorine content (mg) | Total Chlorine content (mL) | Rate of Chlorine content (mL/min) | Average Rate of Chlorine Evolution (mL/min) |
|---|---|---|---|---|---|---|---|
| 1 | 1.2 | 3.6 | 1.2 | 6.0 | 1.9 | 0.38 | 0.33 ± 0.08 |
| 2 | 1.2 | 1.2 | 1.2 | 3.6 | 1.1 | 0.23 | |
| 3 | 1.2 | 3.6 | 1.2 | 6.0 | 1.9 | 0.38 | |

[a]Irradiation conditions: 1.7M $YCl_3$, 1N $HNO_3$, 5 min. 20 μA beam current.

Effect of Cation and Anion

Figure 7:
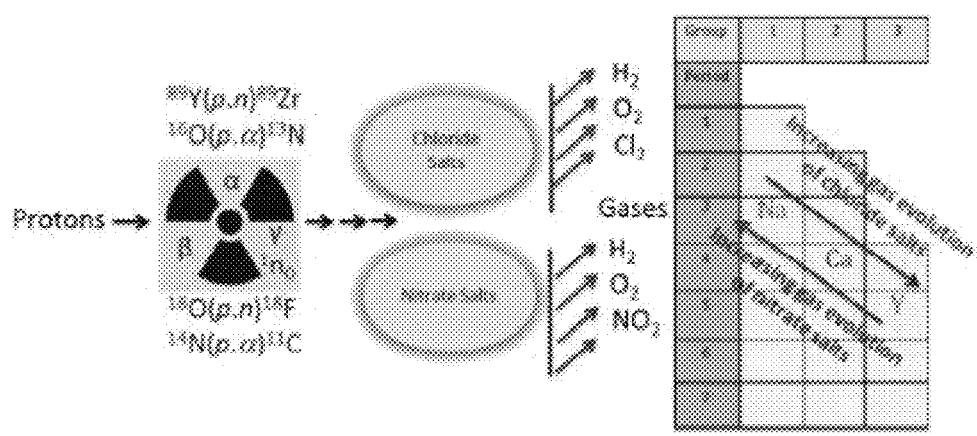
FIG. 7 shows trends of gas evolution rate for chloride and nitrate solutions under proton irradiation.

The rate of gas evolution depended on both cation and anion solutes and their concentrations (see Tables 5-6). A solution of 1.7M $YCl_3$ produced 8-fold higher gas as compared to 1.7M $Y(NO_3)_3$. In contrast, NaCl produced one-third the rate of gas evolution compared to $NaNO_3$ (see Table 5). The rate of gas evolution for calcium salts lay between Y and Na salts (see Table 5). Thus, a gradual increase in the rate of gas evolution was observed for chloride salts upon descending diagonally from Na to Y in periodic table (see FIG. 7). This trend was reversed for nitrate salts and led to decreases in the rate of gas evolution from Na to Y (see Table 5). The reversed trend strongly indicates disparate interactions of metal cations ($Na^+$, $Ca^{2+}$ and $Y^{3+}$) and anions ($Cl^-$ and $NO_3^-$) in the solution target. The effect of changing salt concentration yielded mixed results. Increasing $YCl_3$ concentration from 0.57 M to 1.7 M resulted in a 47% increase in gas evolution, while no effect was observed for the same increase in concentration of $Y(NO_3)_3$ (see Table 5).

TABLE 5

Rate of gas evolution of different salt solutions at variable concentrations

| Molar concentration | Rate of gas evolution (mL/min)* | |
| --- | --- | --- |
| Yttrium ($M^{3+}$) | $Y(NO_3)_3$ | $YCl_3$ |
| 0.57M | 6.22 ± 0.96 | 26.66 ± 0.01[a] |
| 1.7M | 5.29 ± 0.07 | 39.22 ± 2.26 [a,b] |
| Calcium ($M^{2+}$) | $Ca(NO_3)_2$ | $CaCl_2$ |
| 0.85M | 8.75 ± 0.50 | 10.67 ± 1.87[c] |
| 1.7M | 8.89 ± 0.69[d] | 19.16 ± 3.58 [e,f] |
| Sodium ($M^+$) | $NaNO_3$ | NaCl |
| 1.7M | 18.78 ± 0.69[g] | 4.89 ± 0.51 [h,i] |

*25 µA beam current, 5 min irradiation time and n = 3
[a] p value < 0.002 versus equimolar $Y(NO_3)_3$.
[b] p value < 0.02 versus 0.57M $YCl_3$.
[c] p value < 0.05 versus 0.57M $YCl_3$.
[d] p value < 0.02 versus 1.7M $Y(NO_3)_3$.
[e] p value < 0.05 versus 1.7M $Ca(NO_3)_2$.
[f] value < 0.003 versus 1.7M $YCl_3$.
[g] p value < 0.001 versus 1.7M $Y(NO_3)_3$ and 1.7M $Ca(NO_3)_2$.
[h] p value < 0.001 versus 1.7M $NaNO_3$.
[i] p value < 0.02 versus 1.7M $CaCl_2$.

Effect of Nitric Acid

In an attempt to reduce the rate of gas evolution via the radiolysis mechanism, the free radical scavengers nitric acid and ethanol were employed as additives (see Tables 6, 7, 8). Addition of 1 M nitric acid to the irradiating solutions resulted in 40%, 50% and 75% reductions in the rate of gas evolution for 1.7 M solutions of $Y(NO_3)_3$, $YCl_3$ (see Table 6) and $NaNO_3$, respectively (see Table 7). Furthermore, 48% and 50% reductions in rate of gas evolution were observed for 2.55M solutions of $Ca(NO_3)_2$ and $CaCl_2$, respectively, on addition of 1 M nitric acid (see Table 6). Exceptionally, a 20% increase in gas evolution was observed on addition of 1 M of nitric acid to 5.1 M NaCl (see Table 6). This increase in gas evolution can be attributed to the chemical reaction of concentrated NaCl and nitric acid, which leads to the formation of HCl gas and $NaNO_3$ [Ref. 45]. Overall, addition of 1M nitric acid resulted in significant reductions of gas evolution. When $Y(NO_3)_3$ concentration was kept at 1.7 M increasing the nitric acid concentration from 1 M to 2 M gave a 67% reduction in rate of gas evolution (see Table 8), but no significant difference was observed above 2 M. Furthermore, the addition of nitric acid eliminated the precipitation of salts within the target. This may be attributed to an immediate resolubilization of $Y(OH)_3$ in nitric acid to $Y(NO_3)_3$, if indeed the former is produced in the radiation spur. Alternatively, the nitric acid may effectively scavenge the hydroxyl radicals before they interact with yttrium. The effect of nitric acid addition suggests radiolysis to be a dominant mechanism for gas evolution in the solution target. Addition of ethanol to both $YCl_3$ and $Y(NO_3)_3$ resulted in rapid formation of precipitates in the target (see Table 7), precluding meaningful interpretation of the gas evolution rates.

TABLE 6

Effect of cation and nitric acid on the rate of gas evolution at same anion concentrations.

| Molar concentration of the target solution | | Rate of gas evolution (mL/min)[a] | | | | |
| --- | --- | --- | --- | --- | --- | --- |
| | | | No Acid | 1M $HNO_3$ | No Acid | 1M $HNO_3$ |
| Yttrium ($M^{3+}$) 1.7M | 5.29 ± 0.07 18.72 ± .69[v] | $Y(NO_3)_3$ | 3.17 ± 0.43[v] | 39.22 ± 2.26 | $YCl_3$ | 18.72 ± 2.69[v] |
| Calcium ($M^{2+}$) 2.55M | 5.75 ± 0.79 10.00 ± 2.05[v] | $Ca(NO_3)_2$ | 2.97 ± 0.29[v] | 20.00 ± 1.25 | $CaCl_2$ | 10.00 ± 2.05[v] |
| Sodium ($M^+$) 5.1M | 14.25 ± 0.43 | $NaNO_3$ | 3.75 ± 0.25v | 10.08 ± 0.58 | NaCl | 12.75 ± 1.56 |

[a] 25 µA beam current, 5 min irradiation time and n + 3.
[v] p value <0.05 versus same salt without $HNO_3$.

TABLE 7

Effect of ethanol on the rate of gas evolution

| Target solution | Rate of gas efflux[a] (mL/min) | Target solution | Rate of gas efflux[a] (mL/min) |
|---|---|---|---|
| 1.7M YCl$_3$ | 39.22 ± 2.26 | 1.7M YCl$_3$ + 50 mM EtOH | 41.0 (ppt)(n = 1) |
| 1.7M Y(NO$_3$)$_3$ | 5.29 ± 0.07 | 1.7M Y(NO$_3$)$_3$ + 50 mM EtOH | 4.25 ± 0.63 (ppt) |
| 1.7M NaNO$_3$ | 18.78 ± 0.69 | 1.7M NaNO$_3$ + 1M HNO$_3$ | 4.44 ± 0.53[v] |
| H$_2$O (no salt) | No observed gas | 1M HNO$_3$ | 5.83 ± 0.29[ε] |

[a]25 μA beam current, 5 min irradiation time and n = 3, ppt - observed precipitate.
[v]p value < 0.05 versus 1.7M NaNO$_3$.
[ε]p value < 0.001 versus pure water.

TABLE 8

Effect of nitric acid and yttrium nitrate concentration on the rate of gas production.

| Target solution | Rate of gas efflux* (mL/min) | Target solution | Rate of gas efflux* (mL/min) |
|---|---|---|---|
| 1.7M Y(NO$_3$)$_3$ + 1.0M HNO$_3$ | 3.17 ± 0.43 | 0.7M Y(NO$_3$)$_3$ + 1.5M HNO$_3$ | 3.63 ± 0.22 |
| 1.7M Y(NO$_3$)$_3$ + 2.0M HNO$_3$ | 1.75 ± 0.14[a] | 1.53M Y(NO$_3$)$_3$ + 1.5M HNO$_3$ | 2.11 ± 0.25[b] |
| 1.7M Y(NO$_3$)$_3$ + 3.0M HNO$_3$ | 1.72 ± 0.35 | 2.75M Y(NO$_3$)$_3$ + 1.5M HNO$_3$ | 1.54 ± 0.61 |

*25 μA beam current, 5 min irradiation time and n = 3.
[a]p value < 0.05 versus 1.7M Y(NO$_3$)$_3$ + 1N HNO$_3$.
[b]p value < 0.05 versus 0.7M Y(NO$_3$)$_3$ + 1.5M HNO$_3$.

Colligative Properties

The colligative properties of the solutions were examined by keeping the anion concentration the same while changing the cation. When chloride is kept constant at 5.1 M, NaCl (5.1 M), CaCl$_2$ (2.55 M), and YCl$_3$ (1.7 M) showed a pattern of increasing gas evolution (Na→Y) in the absence of acid (see Table 6). This pattern of gas evolution was not observed when the nitrate ion concentrations were kept the same (see Table 6). While no difference was observed between Y and Ca, the rate of gas evolution was paradoxically higher with Na. We do not have a clear explanation of this finding, but there appears to be an interaction between the various cations and anions. Since radiolysis-induced gas evolution may be at a minimum rate with nitrate salt solutions, the effect of cation may be accentuated.

Putative Explanation of Gas Evolution

The radiolysis of water due to ionizing radiation is well documented in literature [Ref. 46,47]. Mechanistic studies of water radiolysis have used kinetics, linear energy transfer characteristics and identification of free radicals [Ref. 48-66]. The primary radiation induced decomposition products of water are hydrogen and hydroxyl radicals:

$$H_2O \rightleftharpoons H\cdot + HO\cdot \quad (1)$$

Eqs. (2a-d) describe the putative reactions for the formation oxygen and hydrogen gas from hydrogen and hydroxyl radicals:

$$H\cdot + H\cdot \rightarrow H_2 \quad (2a)$$

$$H\cdot + H_2O \rightarrow H_2 + HO\cdot \quad (2b)$$

$$HO\cdot + 2H_2O_2 \rightarrow 2H_2O + O_2 + HO\cdot \quad (2c)$$

$$2H_2O_2 \rightarrow 2H_2O + O_2 \quad (2d)$$

Irradiation of pure water with protons in a cyclotron target produced minimal quantities of gas, as evidenced by a small and stable increment in target pressure and no measurable gas efflux (see Table 7). As noted previously [Ref. 60, 64-66] in this situation the steady-state rate of formation of radicals must equal the rate of recombination of radicals (Eq. (1)). The presence of metal salt in the water may alter the balance of formation and recombination of radicals and thereby promote radiolysis. Thus, the formation of any chemical species utilizing either H· or OH· radicals will reduce their rate of recombination.

Recent studies conducted by the Mostafavi group [Ref. 52-56] using picosecond pulse radiolysis on 2 M sodium chloride/bromide solutions showed the formation of Cl/BrOH·$^-$ intermediates via Eqs. (3) and (4) [Ref. 62,63]. At 5-6 M halide concentrations, the predominant free radical formed is $X_2\cdot^-$ (X=Cl, Br) [Ref. 52,53]. The high yield of XOH·$^-$ (X=Cl, Br) at 2 M concentrations suggests consumption of hydroxyl radicals by halide ions. We could not measure free radical intermediates in our studies, but our observations of high gas evolution rates with chloride salts, particularly of Ca and Y are consistent with this mechanism. In particular, the increase of chloride concentration as the solutes were changed from NaCl→CaCl$_2$→YCl$_3$ resulted in dramatic increases in gas evolution (see Table 5), putatively due to increase in the rate of hydroxyl radical scavenging to form the ClOH·$^-$ intermediate and thus decrease H· and OH· recombination. Increasing chloride salt concentrations while maintaining the same cation also increased the rate of gas evolution (see Table 5, FIG. 8a).

$$HO\cdot^- + X^- \rightarrow XOH\cdot^- (X=Cl, Br) \quad (3)$$

$$HO^- + X\cdot \rightarrow XOH\cdot (x=Cl, Br) \quad (4)$$

Interestingly, when solutions of the chlorides of Na, Ca and Y were irradiated while maintaining the same chloride concentration (see FIG. 8b), differences in gas evolution rates were also observed, demonstrating the role of the metal cations as well. To further support the hydroxyl radical consumption hypothesis, when 1 N HNO$_3$ was added to the solution of YCl$_3$ the rate of gas evolution went down by 50% with no precipitation observed. This can be attributed to the high affinity of the hydroxyl species with the acidic protons (H$^+$), thereby forming H$_2$O·$^+$ (also known as "hole"):

$$HO\cdot + HNO_3 H_2O\cdot^+ + NO_3^- \quad (5a)$$

According to the studies of Balcerzyk et al. [Ref. 52,53], a hole can further interact with a nitrate ion to form a nitrate radical and water molecule (Eq. (5b)).

$$H_2O\cdot^+ + NO_3^- \rightarrow NO_3\cdot + H_2O \text{(indirect effect-hole scavenging)} \quad (5b)$$

Additionally, nitrate radicals can also be formed directly by irradiation of nitrate (Eq. (6)) or through conversion of nitrate to nitrite and the oxygen radical intermediate (·O—) (Eq. (7a) & (7b)) [Ref. 51,52]:

$$NO_3^- \rightarrow NO_3\cdot + e^- \text{(direct)} \quad (6)$$

$$NO_3^- \rightarrow NO_2^- + \cdot O\cdot \text{(direct)} \quad (7a)$$

$$NO_2^- + \cdot O^- + H^+ \rightarrow NO_3\cdot + HO\cdot \text{(indirect)} \quad (7b)$$

Finally, the nitrate radical can combine with hydrogen radical to form nitric acid, thereby competing with the formation of hydrogen gas:

$$H\cdot + NO_3\cdot \rightarrow HNO_3 \quad (8)$$

Thus, the presence of nitric acid effectively converts hydrogen and hydroxyl radicals back to water via the combination of Eqs. (1) and (5-8), although several free radical species ($NO_3\cdot$, $H_2O\cdot^+$, $\cdot O$—) may be involved as intermediates.

Figure 8:
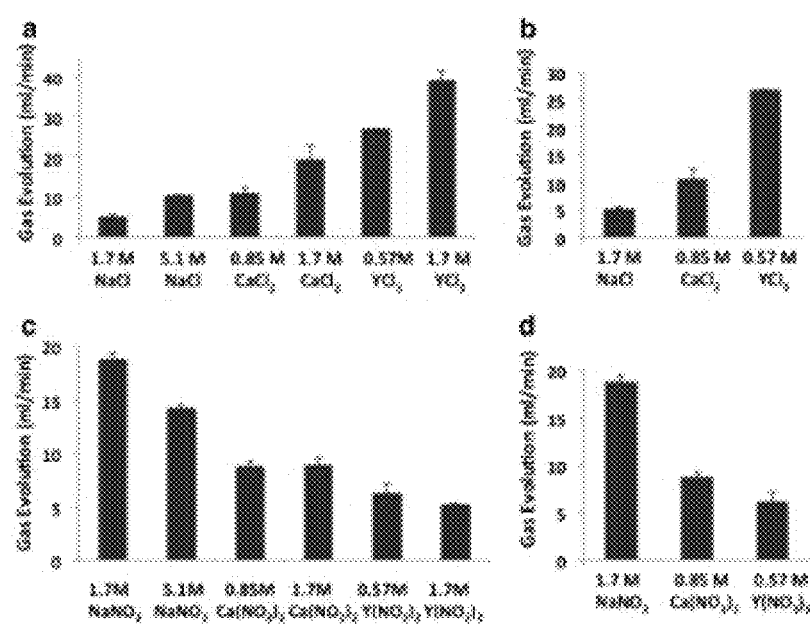
FIG. 8 shows gas evolution rates as a function of (a) concentration of chloride salt; (b) cation at equal chloride content; (c) concentration of nitrate salt; (d) cation at equal nitrate content (data from Tables 5-8).

Irradiation of nitrate salts in the absence of nitric acid allows greater interaction of hydroxyl radicals with metal cations resulting in increased gas evolution. However, hydroxyl radicals would be predicted to be increased in nitrate solutions according to Eqs. (6a and b) whereas hydroxyl radicals are consumed by chloride according to Eqs. (3 and 4), consistent with the markedly higher gas evolution rates observed with chloride salts compared to the nitrate salts. Nevertheless, the presence of nitrate ion per se appears to decrease water decomposition as shown by the comparison of gas evolution rates for increasing salt concentrations (see FIG. 8c). An increase in gas evolution was seen with increased chloride concentration (holding the cation concentration constant), while the opposite was seen for nitrate salts (see FIG. 8a versus 8c). As noted previously, there exist disparate metal ion ($Na^+$, $Ca^{2+}$, $Y^{3+}$) to anion ($Cl^-$ and $NO_3^-$) interactions in the different solutions (see FIG. 8a-8d). FIG. 8 summarizes the trends found in gas evolution. Further mechanistic study may be required to elucidate the effects of different metal cations with anions in solution in response to proton irradiation. For example, pico-second pulse radiolysis experiments [Ref. 52-56] may be able to determine concentrations of critical intermediates that may provide more precise information about such interactions.

Developed Production of $^{89}Zr$

Based on these findings, we developed the production conditions with 2.75 M $Y(NO_3)_3$ solutions to give $^{89}Zr$ production yield of 4.36-4.55 MBq/μA·h before isotope separation with specific activity 464±215 MBq/μg at 20 μA beam current over 1-2 hours of irradiation (see Table 9). To avoid precipitation of target salts, the $HNO_3$ concentration was increased from 1 M to 1.5 M as the duration of irradiation was increased from 1 hour to 2 hours.

All runs were performed with 2.75M $Y(NO_3)_3$ and beam current of 20 μA. Yields were before isotope separation.

Figure 9:
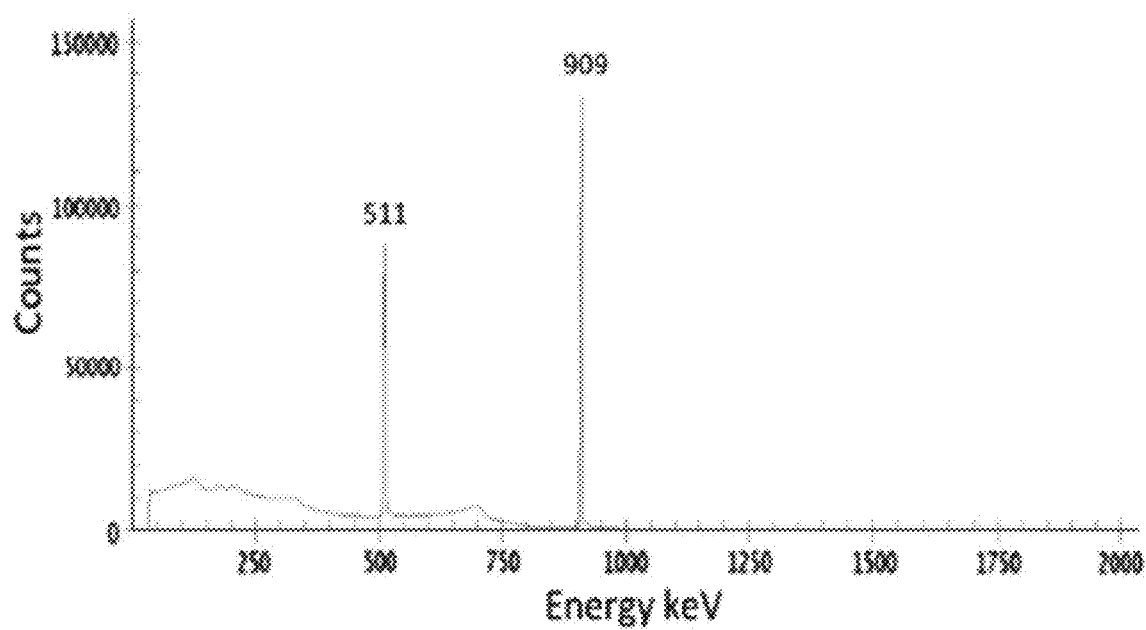
FIG. 9 shows the characterization of radionuclidic purity of a $^{89}$Zr sample on a HPGe detector.

Measurements of specific activity for seven runs encompassing the conditions are shown in Table 10. After 24 hours post-EOB (end of bombardment), a purified sample of $^{89}Zr$ was analyzed on an HPGe gamma spectrometer. The analysis showed two photon peaks at 511 keV and 909 keV energies, both corresponding to $^{89}Zr$. No other peaks were observed, indicating that the radionuclidic purity of $^{89}Zr$ was >99% (see FIG. 9).

TABLE 9

Developed yields of $^{89}Zr$ in solution target.

| Irradiation Time (min) | $HNO_3$ (M) | Yield (MBq) | Yield (MBq/μA · h) |
|---|---|---|---|
| 60 (n = 3) | 1.00 | 81.03 ± 14.4 | 4.55 ± 1.07 |
| 90 (n = 3) | 1.25 | 108.04 ± 17.3 | 4.47 ± 0.62 |
| 120 (n = 3) | 1.50 | 153.18 ± 15.1 | 4.36 ± 0.48 |

TABLE 10

Specific activities of purified $^{89}Zr$

| | Experiment[a] | | | | | | | |
|---|---|---|---|---|---|---|---|---|
| | 1 | 2 | 3 | 4 | 5 | 6 | 7 | Average ± sd (n = 7) |
| Specific Activity (MBq/μg) | 192.4 | 358.9 | 418.1 | 518 | 666 | 802.9 | 292.3 | 464 ± 215 |

[a] 2.75M $Y(NO_3)_3$ + 1.5N $HNO_3$, 120 min irradiation at 20 μA beam current.

Conclusion for Example 2

In summary, a solution target approach for production of $^{89}Zr$ was successfully developed. The major obstacles in implementing a solution target for $^{89}Zr$ production were identified as gas evolution due to radiation-induced water decomposition and in-target precipitation of salts. Gas evolution followed a consistent trend across Groups 1-3 metals, however, disparate interactions between the metal cations and anions (chloride versus nitrate) were observed. Gas evolution can be minimized significantly by addition of nitric acid and use of nitrate salts. The present study of Example 2 provides foundational information on the design and development of solution targets, and should be applicable for production of other radiometals such as $^{68}Ga$, $^{64}Cu$, $^{63}Zn$, $^{86}Y$, $^{61}Cu$, $^{99m}Tc$, $^{45}Ti$, $^{13}N$, $^{52}Mn$, or $^{44}Sc$. Applications for use of the radiometals include, without limitation, labeling of diagnostic and therapeutic compounds for medical purposes.

Example 3

Example 3 describes the production of $^{13}N$-ammonia with a solution target. For production of $^{13}N$-ammonia, the solution target was configured with a standard Havar® cobalt alloy window foil (40 μm thickness) without a degrader foil or helium cooling. The target was loaded with 1.6 mL 50 μM EtOH in deionized water and pressurized to 90 psi. The target was irradiated with 16.5 MeV protons (GE PETtrace) for 15 minutes at 35 μA beam current. Target pressure was stable during the run at ~133 psi. The target liquid was unloaded to a hot cell, passing through a sterile filter (0.2 m) before collection in a product vial. The amount of $^{13}N$-ammonia produced was 513±29 mCi uncorrected for decay. The conventional silver target used for $^{13}N$-ammonia production yields approximately 330 mCi under the same irradiation conditions, however, in this case, the target is rinsed once with nonradioactive water to increase the transfer of the $^{13}N$-ammonia produced. Undesirable release of volatile $^{13}N$-labeled byproduct gases ($NO_x$) were reduced from approximately 15 mCi with the silver target to approximately 3 mCi with the new target.

Example 4

Overview of Example 4

Example 4 improves the cyclotron production yield of $^{89}$Zr using a solution target by developing an easy and simple synthesis of the hydroxamate resin used to process the target, and investigating biocompatible media for $^{89}$Zr elution from the hydroxamate resin.

A new solution target with enhanced heat dissipation capabilities was designed by using helium-cooled dual foils (0.2 mm Al and 25 mm Havar®) and an enhanced water-cooled, elongated solution cavity in the target insert. Irradiations were performed with 14 MeV protons on a 2 M solution of yttrium nitrate in 1.25 M nitric acid at 40-μA beam current for 2 hours in a closed system. Zirconium-89 was separated from Y by use of a hydroxamate resin. A one-pot synthesis of hydroxamate resin was accomplished by activating the carboxylate groups on an Accell™ Plus CM cation exchange resin using methyl chloroformate followed by reaction with hydroxylamine hydrochloride. After trapping of $^{89}$Zr on hydroxamate resin and rinsing the resin with HCl and water to release Y, $^{89}$Zr was eluted with 1.2 M $K_2HPO_4/KH_2PO_4$ buffer (pH 3.5). ICP-MS was used to measure metal contaminants in the final $^{89}$Zr solution.

The new target produced 349±49 MBq (9.4±1.2 mCi) of $^{89}$Zr at the end of irradiation with a specific activity of 1.18±0.79 GBq/μg. The hydroxamate resin prepared using the new synthesis showed a trapping efficiency of 93% with a 75 mg resin bed and 96-97% with a 100-120 mg resin bed. The elution efficiency of $^{89}$Zr with 1.2 M $K_2HPO_4/KH_2PO_4$ solution was found to be 91.7±3.7%, compared to >95% for 1 M oxalic acid. Elution with phosphate buffer gave very small levels of metal contaminants: Al=0.40-0.86 μg (n=2), Fe=1.22±0.71 μg (n=3), Y=0.29 μg (n=1).

The new solution target doubled the production quantity of $^{89}$Zr from the previously reported 153±15 MBq to 349±49 MBq for the same 2 hour of irradiation and 40 μA beam current. The new one-pot synthesis of hydroxamate resin provides a simpler synthesis method for the $^{89}$Zr trapping resin. Finally, phosphate buffer elutes the $^{89}$Zr from the hydroxamate resin in high efficiency while at the same time providing a more biocompatible medium for subsequent use of $^{89}$Zr.

1. Introduction for Example 4

Zirconium-89 has gained considerable attention for labeling antibodies due to its favorable PET imaging characteristics ($\beta^+_{max}$-0.9 MeV, 22.7%) and a half-life ($T_{1/2}$-78.4 hours) that matches the biological half-life of antibodies. Several monoclonal antibodies have been labeled with $^{89}$Zr using the bifunctional chelator desferrioxamine (DFO) and are currently under clinical investigation for diagnostic imaging and therapeutic monitoring applications. For example, $^{89}$Zr-DFO-cetuximab is an anti-epidermal growth factor receptor monoclonal antibody labeled with $^{89}$Zr that is being investigated for PET imaging of metastatic colorectal cancer [Ref. 67], while $^{89}$Zr-DFO-bevacizumab is an anti-vascular endothelial growth factor-A monoclonal antibody labeled with $^{89}$Zr that is being investigated for evaluation of lesions in patients with Von Hippel-Lindau disease [Ref. 68], renal cell carcinoma [Ref. 69], breast cancer [Ref. 70], and neuroendocrine tumors [Ref. 71]. Zirconium-89-DFO-trastuzumab is a radiolabeled anti-HER2 monoclonal antibody currently under investigation for breast cancer imaging [Ref. 72]. Various other monoclonal antibodies are being investigated for PET imaging of pancreatic, ovarian and prostate cancers [Ref. 73]. Zirconium-89 has also been investigated for cell labeling using $^{89}$Zr-protamine sulfate [Ref. 74], $^{89}$Zr-oxine [Ref. 75, 76], and $^{89}$Zr-desferrioxamine-NCS $^{89}$ZrDBN [Ref. 77]. The 78.4 hour half-life of $^{89}$Zr allows in-vivo tracking of the labeled cells for prolonged periods of time (weeks), which is being instrumental in understanding the cell-based therapies and imaging.

Zirconium-89 can be produced using solid and liquid target methods via the $^{89}$Y(p,n)$^{89}$Zr reaction [Ref. 78-80]. Solid target methods require higher infrastructure cost because of the expense of the target handling system and are challenging to implement in PET facilities equipped with self-shielded cyclotrons. However, the solution target approach offers a viable alternative to the solid target system that can meet the modest needs for $^{89}$Zr at most institutions.

Production of radiometals in a solution target is challenging because of in-target salt precipitation and unstable target pressures caused by gas evolution during irradiation [see Example 2 above], but these problems have been attenuated by using nitrate salts of the target metal in dilute nitric acid solutions [see Example 2 above]. We reported a mechanistic study on the effect of solution composition on in-target chemistry [see Example 2 above], the effect of nitric acid [see Example 2 above], and a second-generation solution target (Brigham Mayo Liquid Target-2 or BMLT-2) design that enhances heat dissipation during production of $^{68}$Ga [FIGS. 1A and 1B described above]. In the present study of Example 4, we investigated the use of this BMLT-2 target for the production of $^{89}$Zr. A significant improvement in the $^{89}$Zr-production yield compared to previous results [see Example 2 above]. We also developed a new method of elution of $^{89}$Zr from hydroxamate resin that offers a biocompatible formulation of $^{89}$Zr for preclinical and clinical studies. Finally, we also developed a short, simplified and one pot synthesis of the hydroxamate resin used for the separation of $^{89}$Zr from the $^{89}$Y target material.

Materials and Methods

Targetry Details

A BMLT-2 target (FIGS. 1A and 1B) was employed for $^{89}$Zr production as described previously. The target included a water-cooled, elongated Ta insert having target volume of 1.6 mL. The dual-foil design used helium cooling on a 0.2 mm aluminum degrader foil and a 0.025 mm Havar® target window foil. The target was installed on a PETtrace cyclotron (GE HealthCare, Waukesha, Wis.) delivering 16.4 MeV protons. The incident proton energy to the target solution was approximately to 14 MeV. A semi-automated system was employed as described previously for target loading and unloading [see Example 2 above].

Chemicals

Yttrium nitrate ($Y(NO_3)_3 \cdot 6H_2O$) was purchased from Strem Chemicals (Newburyport, Mass., USA). Oxalic acid dehydrate [TraceSELECT®, ≥99.9999% metals basis] was purchased from Sigma-Aldrich (St. Louis, Mo., USA). Nitric acid (70% purified by redistillation) ≥99.999% trace metals basis as purchased from Fisher Scientific (Suwanee, Ga., USA). Chelex-100 resin (50-100 mesh, sodium form) was purchased from Bio-Rad. Accell Plus CM (300 Å, WAT 010740) weak cation exchange resin (carboxylate resin) was purchased from Waters Inc. (Milford, Mass., USA). The phosphate buffer used for $^{89}$Zr elution was 1.2 M $K_2HPO_4$/$KH_2PO_4$ buffer (pH 3.5) prepared in-house using ≥99.999% trace metals basis $K_2HPO_4$ and $KH_2PO_4$, both purchased from Sigma-Aldrich (St. Louis, Mo., USA). $Na_2HPO_4$ and $NaH_2PO_4$ ≥99.999% trace metals basis were also purchased from Sigma-Aldrich (St. Louis, Mo., USA)

Instrumentation

For determining radionuclidic purity, a high-purity germanium gamma spectrometer (Canberra, Meriden, Conn., USA) counter running Genie 2000 software was used. Sample radioactivity was measured using a CRC dose calibrator (489 setting, CRC-55tPET, Capintec, Ramsey, N.J., USA). A Perkin Elmer ELAN DRC II ICP mass spectrometer was employed to analyze trace metal contaminants. IR spectra were recorded as KBr pellets using a ThermoNicolet Avatar 370 FT-IR (Waltham, Mass., USA).

Method for $^{89}$Zr Separation and Determination of Specific Activity

Synthesis of Hydroxamate Resin

The hydroxamate resin was synthesized by stirring the Accell™ Plus CM cation exchange carboxylate resin (2.00 g), methyl chloroformate (2.0 mL, 25.8 mmol) and triethylamine (2.0 mL, 14.3 mmol) in anhydrous dichloromethane (30 mL) at 0° C. for 30 minutes and then at room temperature for additional 90 minutes. The temperature of the mixture was further lowered to 0° C. before addition of hydroxylamine hydrochloride (0.6 g, 8.63 mmol) and triethylamine (2.0 mL, 14.3 mmol). The resultant mixture was stirred at room temperature for an additional 15 hours. The solvent was removed under vacuum, and cold water was poured with constant stirring into the flask containing the functionalized resin. The resin was filtered, washed extensively with water, and dried under vacuum. Total amount of hydroxamate resin recovered was 1.9-2.0 g.

Validation of Hydroxamate Resin

Hydroxamate resin was packed into an empty cartridge having plastic frit on both the sides. The resin was activated with acetonitrile (8 mL), water (15 mL), and hydrochloric acid (2 mL 2 M) as described previously [Ref. 79, 80] prior to testing the trapping efficiency. Different amounts of hydroxamate resin were evaluated for their efficiency in trapping of $^{89}$Zr. The conversion of carboxylate group to a hydroxamate group on the resin was also characterized by infrared (IR) spectrometric analysis.

Separation of $^{89}$Zr

Separation of $^{89}$Zr from the irradiated $Y(NO_3)_3$/$HNO_3$ solution was achieved by trapping the $^{89}$Zr on a custom-made hydroxamate column as described previously [Ref. 80]. The $Y(NO_3)_3$ target material was removed from the column by rinsing the resin with 2 M HCl (75 mL) and water (10 mL). Zirconium-89 was eluted from the resin using 1 M oxalic acid or a new elution reagent composed of 1.2 M $K_2HPO_4$/$KH_2PO_4$ (pH 3.5) (phosphate buffer). For the latter, $^{89}$Zr elution was performed using a 2-step procedure whereby after rinsing with 2 M HCl followed by water to remove the Y target material, the $^{89}$Zr-containing resin was first wetted with ~0.25 mL of phosphate buffer and allowed to interact on the column for 30-min before eluting the $^{89}$Zr with an additional 1.75 mL of phosphate buffer. The eluted $^{89}$Zr is in the form of $^{89}$Zr-hydrogen phosphate ($^{89}$Zr($HPO_4)_2$).

Specific Activity

The specific activity (MBq/μg) of $^{89}$Zr was calculated based on measurement of total amount of Zr present in the final $^{89}$Zr($HPO_4)_2$ solution using ICP-MS. The sample was assayed for other trace metals including Al, Ga, Fe, Cu, Ni, Zn, Co, Pb, Y, Sc, Rh, Mg, Lu, In, and Ca but only Fe, Y, Al and Zr were found to be present at detectable levels.

Statistical Analysis

All values are given as mean±standard deviation using Microsoft office excel program.

Results and Discussion

Resin Synthesis and Trapping Efficiency

The previously described synthesis of the hydroxamate resin is a cumbersome process involving multiple reactions, purifications, and use of hazardous chemicals such as 2,3,5,6-tetrafluorophenol [Ref. 79, 82, 83]. To address the need for a more practical and economical preparation of hydroxamate resin we developed a simplified, one-pot synthesis method using the same starting carboxylate resin. The carboxylate group on the resin was activated by methyl chloroformate and then converted into a hydroxamate functionality using hydroxylamine hydrochloride in presence of triethylamine [Ref. 84]. The synthesis method was optimized for 2 g scale. We characterized the hydroxamate resin by both infrared spectroscopic analysis and $^{89}$Zr trapping following the literature approach [Ref. 79]. The asymmetric and symmetric stretching frequencies of the carbonyl of (>C=O) of the carboxylate moiety appeared at 1571.6 and 1403.7 $cm^{-1}$. The relative intensity of both the peaks was decreased compared to the non-functionalized resin while additional peaks at 1726 $cm^{-1}$ and 1672 $cm^{-1}$, characteristic of the asymmetric and symmetric stretching frequencies of hydroxamate (—CONHOH) appeared in the hydroxamate functionalized resin compared to starting carboxylate resin [Ref. 79]. Additionally, a medium to strong band at 1550 $cm^{-1}$ for —N—H deformation and C—N stretching vibration for amide II bands were reported for hydroxamic acids [Ref. 85]. In our case, we also observed a strong band at 1552 $cm^{-1}$, confirming the presence of the hydroxamate group.

The resin was tested for $^{89}$Zr trapping efficiency with different bed loads. A trapping efficiency of 93% was obtained with a 75 mg bed load. Higher amounts of resin (100-120 mg) increased the trapping efficiency to 96-97%, but larger buffer volumes were then needed to elute the $^{89}$Zr, which resulted in more dilute final solutions (see below). Thus 75 mg of resin was found to be optimal to obtain a highly concentrated solution of $^{89}$Zr-hydrogen phosphate or $^{89}$Zr-oxalate.

Isolation $^{89}$Zr as $^{89}$Zr($HPO_4)_2$

Oxalic acid has been extensively used for elution of $^{89}$Zr from the hydroxamate resin [Ref. 79, 82, 83]. However, the toxicity of oxalic acid prevents this solution to be used directly in biological systems [Ref. 79]. Holland et al. [Ref. 79] described a method to convert $^{89}$Zr-oxalate to $^{89}$ZrCl$_2$ using a QMA cartridge (anion exchange resin) followed by elution with 0.9% saline solution or 1.0 M hydrochloric acid. Hydrochloric acid gave good elution efficiency but required 110° C. evaporation step prior to the further use of the $^{89}$Zr, whereas 0.9% saline solution gave only 22-38% elution efficiency [Ref. 79]. There is, therefore, a need for an improved $^{89}$Zr elution/formulation strategy. To address this issue we employed phosphate buffer to elute the $^{89}$Zr from the hydroxamate resin. The elution efficiency was optimized by evaluating various concentrations of phosphate buffers (Table 11), and 1.2 M K$_2$HPO$_4$/KH$_2$PO$_4$ at pH 3.5 was found to be optimal, producing 91.7±3.7% elution efficiency using a total of 2 mL of buffer after an initial 30 minutes of equilibration on the column. Elution was performed in four 0.5 mL aliquots to provide an increased concentration of $^{89}$Zr in one of the four fractions. For comparison to the conventional approach, a 1 M-oxalate solution (1 mL) was also utilized to elute $^{89}$Zr. The metal contaminants were analyzed in both the $^{89}$Zr-hydrogen phosphate and $^{89}$Zr-oxalate solutions, and found that both solutions contain similar small amounts of Al, Fe and Y (see Table 12). Indeed, we have utilized this formulation strategy to effectively label stem cells without the need to reformulate $^{89}$Zr eluted in oxalic acid [Ref. 77].

TABLE 11

$^{89}$Zr elution efficiencies from hydroxamate resin as a function of eluent.

| Eluent | Elution Efficiency |
|---|---|
| 1M H$_3$PO$_4$ | 67-84% |
| 1M NaH$_2$PO$_4$ | 40-90% |
| 2M (pH 3.5) NaH$_2$PO$_4$ | 73-94% |
| 1M (pH 7.0) Na$_2$HPO$_4$/NaH$_2$PO$_4$ | 41-93% |
| 1.2M (pH 3.5) K$_2$HPO$_4$/KH$_2$PO$_4$, | 91.7 ± 3.7% (n = 8) |

TABLE 12

Metal impurities in the final $^{89}$Zr product as a function of eluent.

| Metal contaminants in $^{89}$Zr-hydrogen phosphate eluent* | Metal contaminants in $^{89}$Zr-oxalate eluent** |
|---|---|
| Al = 0.40-0.86 µg (n = 2), | Al = 2.39-5.38 µg (n = 2), |
| Fe = 1.22 ± 0.71 µg (n = 3), | Fe = 1.10-1.20 µg (n = 2), |
| Y = 0.29 µg (n = 1) | Y = 0.50 µg (n = 1) |

*Total 4 samples were analyzed for a wide range of metal impurities (listed in Example 4 method section) but detectable contaminants were present only in few samples and their numbers are written in the parenthesis.
**Total 2 samples were analyzed for a wide range of metal impurities (listed in Example 4 method section) but detectable contaminants were present only in few samples and their numbers are written in the parenthesis.

Production of $^{89}$Zr

The enhanced heat dissipation capacity of the BMLT-2 target (FIGS. 1A and 1B) resulted in stabilized target pressure and avoidance of in-target precipitation issues during $^{89}$Zr production for beam currents up to 40 µA. We used 2 M yttrium nitrate in a 1.25 M nitric acid to minimize in-target precipitation. Initially, we tested different beam currents ranging from 10-40 µA by monitoring the change in-target pressure in a closed target system. Once we established that target pressure reached a steady state by 10-20 minutes of irradiation, we extended the irradiation time 2 hours. The production rate per mA was increased by approximately 12% from 3.82±0.37 MBq/µA·h to 4.36±0.60 MBq/µA·h, but due to the doubling of beam current the overall activity produced was found to be more than double in same 2 hours of irradiation from 153.18±15.1 MBq [see Example 2] to 348.88±48.7 MBq (Table 13). The specific activity of the $^{89}$Zr was not changed significantly from 464±215 MBq/µg [see Example 2] to 1186±799 MBq/µg.

Analysis of metal contaminants in the $^{89}$Zr product solution was carried out using ICP-MS (Table 14), and only small amounts of Al (2.28±1.23 µg), Fe (1.90±1.23 µg), and Y (0.29±0.21 µg) were found. All other metals were below detection limits.

TABLE 13

$^{89}$Zr production rates in first and second generation solution targets

| | Molar concentration of Y(NO$_3$)$_3$ (M) | Beam Current (µA) | HNO$_3$ (M) | Decay Corrected EOB activity (MBq) | Production rate (MBq/µA · h) |
|---|---|---|---|---|---|
| TS-1650 target* (n = 3) | 2.75 | 20 | 1.50 | 153.1 ± 15.1 (4.14 ± 0.4 mCi) | 3.82 ± 0.37 |
| BMLT-2 target (n = 7) | 2.00 | 40 | 1.25 | 348.8 ± 48.7 (9.4 ± 1.2 mCi) | 4.36 ± 0.60 |

*data from Example 2.

All irradiations were performed for 2 hours. Yields were calculated before isotope separation at end of beam.

TABLE 14

Specific activities of purified $^{89}$Zr in first and second generation solution targets.

| Specific Activity of $^{89}$Zr produced using the TS-1650*** solution target (n = 7) *(MBq/μg) | Specific Activity of $^{89}$Zr in a BMLT-2 (FIGS. 1A and 1B) target (n = 3)** (MBq/μg) |
|---|---|
| 464 ± 215 | 1186 ± 799 |

*2.75M Y(NO$_3$)$_3$ in 1.5N HNO$_3$, 2 hours irradiation at 20 μA beam current.
**2.0M Y(NO$_3$)$_3$ in 1.25N HNO$_3$, 2 hours irradiation at 40 μA beam current.
***A F-18 target designed by Bruce Technologies (see Example 2)

Figure 10:
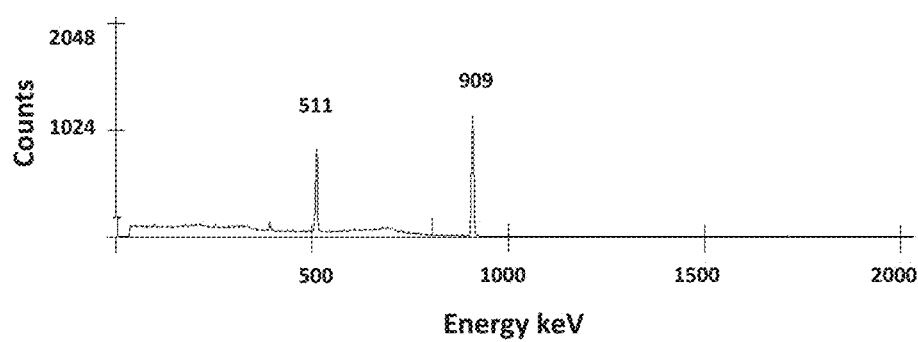
FIG. 10 shows a HP—Ge spectrum of a $^{89}$Zr sample showing absence of peaks other than those due to $^{89}$Zr.

A purified sample of $^{89}$Zr was analyzed on an HP—Ge gamma spectrometer for radionuclidic purity. The energy spectrum showed two photon peaks at 511 keV and 909 keV energies, both corresponding to $^{89}$Zr. No other peaks were observed, indicating that the radionuclidic purity of $^{89}$Zr was >99% (see FIG. 10).

CONCLUSIONS

In summary, the newly designed BMLT-2 target of FIGS. 1A and 1B increased the production rate of $^{89}$Zr by approximately 12% from 3.82±0.37 MBq/μA·h to 4.36±0.60 MBq/μA·h; but since the new target increased current capacity 2-fold, the $^{89}$Zr yield for the same 2 hour irradiation increased by more than 2-fold from 153.18±15.1 MBq to 348.88±48.7 MBq. But, the specific activity of the $^{89}$Zr did not change significantly from 464±215 MBq/μg to 1186±799 MBq/μg. Additionally, a simple one-pot synthesis of the hydroxamate resin and a new method of elution of $^{89}$Zr from the hydroxamate resin with a phosphate buffer were developed to improve the practicality of $^{89}$Zr production and provide a final formulation in a more biologically acceptable medium than the previously used oxalic acid solution.

REFERENCES

[1] Velikyan I., Prospective of $^{68}$Ga-Radiopharmaceutical Development. Theranostics 2014; 4: 47-80.
[2] Banerjee S R, Pomper M G., Clinical applications of Gallium-68. Appl Radiat Isot 2013; 76: 2-13.
[3] Zimmerman B E., Current status and future needs for standards of radionuclides used in positron emission tomography. Appl Radiat Isot 2013; 76: 31-37.
[4] Smith D L, Breeman W A P, Sims-Mourtada J., The untapped potential of Gallium 68-PET: The next wave of 68Ga-agents. Appl Radiat Isot 2013; 76: 14-23.
[5] Baum R P, Kulkarni H R., Theranostics: from molecular imaging using Ga-68 labeled tracers and PET/CT to personalized radionuclide therapy—the Bad Berka experience. Theranostics 2012; 2: 437-47.
[6] Öberg K., Gallium-68 somatostatin receptor PET/CT: Is it time to replace 111Indium DTPA octreotide for patients with neuroendocrine tumors? Endocrine 2012; 42: 3-4.
[7] Schreiter N F, Brenner W, Nogami M, Buchert R, Huppertz A, Pape U F, Prasad V, Hamm B, Maurer M H., Cost comparison of $^{111}$In-DTPA-octreotide scintigraphy and $^{68}$Ga-DOTATOC PET/CT for staging enteropancreatic neuroendocrine tumours. Eur J Nucl Med Mol Imaging 2012; 39: 72-82.
[8] Hofman M S, Kong G, Neels O C, Eu P, Hong E, Hicks R J., High management impact of Ga-68 DOTATATE (GaTate) PET/CT for imaging neuroendocrine and other somatostatin expressing tumours. J Med Imaging Radiat Oncol 2012; 56: 40-7.
[9] Jacobsson H, Larsson P, Jonsson C, Jussing E, Gryback P., Normal uptake of $^{68}$Ga-DOTA-TOC by the pancreas uncinate process mimicking malignancy at somatostatin receptor PET. Clin Nucl Med 2012; 37: 362-5.
[10] Engle J W, Lopez-Rodriguez V, Gaspar-Carcamo R E, Valdovinos H F, Valle-Gonzalez M, Trejo-Ballado M, Severin G W, Barnhart T E, Nickles R J. Avila-Rodriguez M A., Very high specific activity $^{66/68}$Ga from zinc targets for PET. Appl Radiat Isot 2012; 70: 1792-1796.
[11] Sadeghi M, Kakavand T, Rajabifar S, Mokhtari L, Nezhad A R., Cyclotron production of 68Ga via proton-induced reaction on 68Zn target. Nukleonika 2009; 54: 25-28.
[12] Rosch F., Past, present and future of 68Ge/68Ga generators. Appl Radiat Isot 2013; 76: 24-30.
[13] Belosi F, Cicoria G, Lodi F, Malizia C, Fanti S, Boschi S, Marengo M., Generator breakthrough and radionuclidic purification in automated synthesis of 68Ga-DOTANOC. Curr Radiopharm 2013, 6: 72-7.
[14] Sadeghi M, Kakavand T, Mokhtari L, Gholamzadeh Z., Determination of 68Ga production parameters by different reactions using ALICE and TALYS codes. Pramana J Phys 2009; 72: 335-341.
[15] Jensen M, Clark J., Direct production of Ga-68 from proton bombardment of concentrated aqueous solutions of [Zn-68] zinc chloride. Proceedings of 13th International Workshop on Targetry and Target Chemistry 2011; 288-292.
[16] DeGrado T R, Byrne J P, Packard A B, Belanger A P, Rangarajan S, Pandey M K., A solution target approach for cyclotron production of Zr-89: Understanding and coping with in-target electrolysis. J Labelled Compd Radiopharm 2011; 54: S248-S248.
[17] Pandey M K, Engelbrecht H P, Byrne J P, Packard A B, DeGrado T R., Production of $^{89}$Zr via the $^{89}$Y(p,n)$^{89}$Zr reaction in aqueous solution: Effect of solution composition on in-target chemistry. Nucl Med Biol 2014; 41: 309-316.
[18] Strelow F E W., Quantitative separation of Gallium from Zinc, Copper, Indium, Iron (III) and other elements by cation-exchange chromatography in hydrobromic acid-acetone medium. Talanta 1980; 27: 231-236.
[19] Szelecsenyi F, Boothe T E, Takacs S, Tarkanyi F, Tavano E., Evaluated cross section and thick target yield data bases of Zn+p processes for practical applications. Appl Radiat Isot 1998; 49: 1005-1032
[20] Takacs S, Tarkanyi F, Hermanne A., Validation and upgrade of the recommended cross section data of charged particle reactions to produce gamma emitter radioisotopes. Nucl Instrum Methods Phys Res 2005; 240: 790-802.
[21] Meulen N P V, Walt T N V., The separation of Fe from Ga to produce ultrapure $^{67}$Ga. Z Naturforsch 2007; 62: 483-486.
[22] Patrascu I, Niculae D, Lungu V, Ursu I, Iliescu M, Tuta C, Antohe A., The purification and quality control of $^{68}$Ga eluates from $^{68}$Ge/$^{68}$Ga generator. Rom Rep Phys 2011; 63: 988-996.
[23] Nayak T K, Brechbiel M W., Radioimmunoimaging with longer-lived positron-emitting radionuclides: potentials and challenges. Bioconjug Chem 2009; 20:825-41.
[24] Lewis J S, Singh R K, Welch M J., Long lived and unconventional PET radionuclides. In: Pomper M G, Gelovani J G, editors. Chapter 18 in molecular imaging in oncology. New York (N.Y.): Informa Healthcare; 2009. p. 283-92 [978-0-8493-7417-3].

[25] Kasbollah A, Eu P, Cowell S, Deb P., Review on production of $^{89}$Zr in a medical cyclotron for PET radiopharmaceuticals. J Nucl Med Technol 2013; 41:35-41.

[26] Van-Dongen G A, Vosjan M J., Immuno-positron emission tomography: shedding light on clinical antibody therapy. Cancer Biother Radiopharm 2010; 25(4):375-85.

[27] Van-Dongen G A, Visser G W, Lub-de Hooge M N, De-Vries E G, Perk L R., Immuno-PET: a navigator in monoclonal antibody development and applications. Oncologist 2007; 12(12):1379-89.

[28] Dejesus O T, Nickles R J., Production and purification of $^{89}$Zr, a potential PET antibody label. Int J Rad Appl Instrum A 1990; 41:789-90.

[29] Link J M, Krohn K A, Eary J F., $^{89}$Zr for antibody labelling and positron tomography. J Labelled Comp Radiopharm 1986; 23:1296-7.

[30] Zweit J, Downey S, Sharma H L., Production of no-carrier-added zirconium-89 for positron emission tomography. Int J Rad Appl Instrum A 1991; 42:199-201.

[31] Meijs W E, Herscheid J D M, Haisma H J., Production of highly pure no-carrier added $^{89}$Zr for the labelling of antibodies with a positron emitter. Appl Radiat Isot 1994; 45:1143-7.

[32] Kumbhar P P, Lokhande C D., Electrodeposition of yttrium from a nonaqueous bath. Met Finish 1995; 93(28):30-1.

[33] Sadeghi M, Kakavand T, Taghilo M., Targetry of $Y_2O_3$ on a copper substrate for the non-carrier-added $^{89}$Zr production via $^{89}$Y(p, n)$^{89}$Zr reaction. Kerntechnik 2010; 75:298-302.

[34] Ráliš J, Lebeda O, Kučera J., Liquid target system for production of $^{86}$Y. ESRR'10-15th Europ. Symp. Radiopharmacy. Radiopharm, 7-12. April 2010, Edinburgh; 2010.

[35] Jensen M, Clark J., Direct production of Ga-68 from proton bombardment of concentrated aqueous solutions of [Zn-68] zinc chloride. Proceedings of 13th International workshop on targetry and target, chemistry; 2011. p. 288-92.

[36] Hoehr C, Morley T, Buckley K, Trinczek M, Hanemaayer V, Schaffer P, et al., Radiometals from liquid targets: $^{94m}$Tc production using a standard water target on a 13 MeV cyclotron. Appl Radiat Isot 2012; 70:2308-12.

[37] DeGrado T R, Packard A B, Kim C K, Pandey M K, Rangarajan S., Cyclotron production of $^{89}$Zr using a solution target. J Nucl Med 2012; 53(Suppl 1) [41 pp.].

[38] DeGrado T R, Byrne J P, Packard A B, Belanger A P, Rangarajan S, Pandey M K., A solution target approach for cyclotron production of $^{89}$Zr: Understanding and coping with in-target electrolysis. J Label Compd Radiopharm 2011; 54:S248.

[39] Holland J P, Sheh Y, Lewis J S., Standardized methods for the production of high specific-activity zirconium-89. Nucl Med Biol 2009; 36:729-39.

[40] Verel I, Visser G W M, Boellaard R, Stigter-van W M, Snow G B, van Dongen GAMS., $^{89}$Zr Immuno-PET: comprehensive procedures for the production of 89Zr-labeled monoclonal antibodies. J Nucl Med 2003; 44:1271-81.

[41] Mulik J, Fuerst R, Guyer M, Meeker J, Sawicki E., Development and optimization of twenty-four hour manual method for the collection and colorimetric analysis of atmospheric $NO_2$. Int J Environ Anal Chem 1974; 3:333-48.

[42] Peschke J, Stray H, Oehme M., Comparison of different methods for determination of sub-ppb levels of $NO_2$ in ambient air using solid adsorbent sampling Fresenius Z. Anal Chem 1988; 330:581-7.

[43] Yamaguchi H, Uchihori Y, Yasuda N, Takada M, Kitamura H H., Estimation of yields of OH radicals in water irradiated by ionizing radiation. J Radiat Res 2005; 46: 333-41.

[44] El Omar A K, Schmidhammer U, Jeunesse P, Larbre J P, Lin M, Muroya Y, et al., Time dependent radiolytic yield of OH. radical studied by picosecond pulse radiolysis. Phys Chem A 2011; 115:12212-6.

[45] Leu M, Timonen R S, Keyser L F, Yung Y L., Heterogeneous reactions of $HNO_3(g)+NaCl(s) \rightarrow HCl$ (s)+ $NaNO_3(s)$ and $N_2O_5(g)+NaCl(s) \rightarrow ClNO_2(g)+NaNO_3(s)$. J Phys Chem 1995; 99:13203-12.

[46] Stel'makh N S, Kritskaya V E, Byvsheva I I, Pirogova G N, Kosareva I M, Pikaev A K., Radiation-induced gas evolution in neutral and alkaline aqueous sodium nitrate and sodium acetate solutions simulating liquid radioactive waste. High Energy Chem 1998; 32(6):377-80.

[47] Caramelle D., Salt radiolysis. 2. Analysis of radiolysis gases. Comm Eur Communities 1991; 151:14-37.

[48] Yakabuskie P A, Joseph J M, Stuart C R, Wren J C., Long-term γ-radiolysis kinetics of $NO_3^-$ and $NO_2^-$ solutions. J Phys Chem A 2011; 115:4270-8.

[49] Balcerzyk A, El Omar A K, Schmidhammer U, Pernot P, Mostafavi M., Picosecond pulse radiolysis study of highly concentrated nitric acid solutions: formation mechanism of $NO_3$. radical. J Phys Chem A 2012; 116: 7302-7.

[50] Kaucic S, Maddock A G. Effect of cation vacancies on radiolysis of sodium nitrate. Trans Faraday Soc 1969; 65:1083-90.

[51] Mezyk S P, Bartels D M., Temperature dependence of hydrogen atom reaction with nitrate and nitrite species in aqueous solution. J Phys Chem A 1997; 101: 6233-7.

[52] Balcerzyk A, Schmidhammer U, El Omar A K, Jeunesse P, Larbre J P, Mostafavi M., Picosecond pulse radiolysis of direct and indirect radiolytic effects in highly concentrated halide aqueous solutions. J Phys Chem A 2011; 115:9151-9.

[53] Balcerzyk A, LaVerne J, Mostafavi M., Direct and indirect radiolytic effects in highly concentrated aqueous solutions of bromide. J Phys Chem A 2011; 115:4326-33.

[54] El Omar A K, Schmidhammer U, Balcerzyk A, LaVerne J, Mostafavi M., Spur reactions observed by picosecond pulse radiolysis in highly concentrated bromide aqueous solutions. J Phys Chem A 2013; 117:2287-93.

[55] Lampre I, Marignier J L, Mirdamadi-Esfahani M, Pernot P, Archirel P, Mostafavi M., Oxidation of bromide ions by hydroxyl radicals: spectral characterization of the intermediate BrOH.$^-$. J Phys Chem A 2013; 117:877-87.

[56] El Omar A K, Schmidhammer U, Rousseau B, LaVerne J, Mostafavi M., Competition reactions of $H_2O.^+$ radical in concentrated $Cl^-$ aqueous solutions: picoseconds pulse radiolysis study. J Phys Chem A 2012; 116:11509-18.

[57] Wolff R K, Bronskill M J, Hunt J W., Picosecond pulse radiolysis studies. II reactions of electrons with concentrated Scavengers. J Chem Phys 1970; 53(11):4211-5.

[58] Bonin J, Lampre I, Soroushian B, Mostafavi M., First observation of electron paired with divalent and trivalent nonreactive metal cations in water. J Phys Chem A 2004; 108:6817-9.

[59] Bonin J, Lampre I, Mostafavi M., Absorption spectrum of the hydrated electron paired with nonreactive metal cations. Radiat Phys Chem 2005; 74:288-96.

[60] LeCaer S., Water radiolysis: influence of oxide surfaces on H$_2$ production under ionizing radiation. Water 2001; 3:235-53.

[61] Ferry J L, Fox M A., Temperature effects on the kinetics of carbonate radical reactions in near-critical and super-critical water. J Phys Chem A 1999; 103:3438-41.

[62] Dean A M., Prediction of pressure and temperature effects upon radical addition and recombination reactions. J Phys Chem 1985; 89(21):4600-8.

[63] Schmidhammer U, Pernot P, Waele V D, Jeunesse P, Demarque A, Murata S, et al., Distance dependence of the reaction rate for the reduction of metal cations by solvated electrons: a picosecond pulse radiolysis study. J Phys Chem A 2010; 114: 12042-51.

[64] Allen A O., Radiation chemistry of aqueous solutions. J Phys Colloid Chem 1948; 52: 479-90.

[65] Barr N F, Allen A O., Hydrogen atoms in the radiolysis of water. J Phys Chem 1959; 63:928-31.

[66] Hayon E, Allen A O., Evidence for two kinds of "H atoms" in the radiation chemistry of water. J Phys Chem 1961; 65:2181-5.

[67] Ruysscher D D., Maastricht Radiation Oncology and VU University Medical Center. Non-invasive Imaging of Cetuximab-$^{89}$Zr uptake with PET: A Phase I Trial in Stage IV Cancer Patients. Clinicaltrials.gov, NCT00691548. https://clinicaltrials.gov/ct2/show/NCT00691548?term=NCT00691548&rank=1

[68] Oosting-Lenstra S F., University Medical Center Groningen and VHL Family Alliance. Visualizing Vascular Endothelial Growth factor (VEGF) Producing Lesions in Von Hippel-Lindau Disease (VHL image). Clinicaltrials.gov, NCT00970970. https://clinicaltrials.gov/ct2/show/NCT00970970?term=NCT00970970&rank=1

[69] Oosting-Lenstra S F., University Medical Center Groningen. VEGF imaging in Renal Cell Carcinoma (Renimage). Clinicaltrials.gov, NCT00831857. https://clinicaltrials.gov/ct2/show/NCT00831857?term=NCT00831857&rank=1.

[70] Schroder C P., University Medical Center Groningen. VEGF Early Imaging for Breast Cancer. Clinicaltrials.gov, NCT00991978. https://clinicaltrials.gov/ct2/show/NCT00991978?term=NCT00991978&rank=1

[71] De Vries G E., University Medical Center Groningen. $^{89}$Zr-bevacizumab PET imaging in Patients with Neuroendocrine tumors (NETPET). Clinicaltrials.gov, NCT01338090. https://clinicaltrials.gov/ct2/show/NCT01338090?term=NCT01338090&rank=1

[72] Chang A J, Desliva R, Jain S, Lears K, Rogers B, Lapi S., $^{89}$Zr-Radiolabeled Trastuzumab Imaging in Orthotopic and Metastatic Breast Tumors. Pharmaceuticals (Basel) 2012; 5(1):79-93

[73] Van de Watering F C J, Rijpkema M, Perk L, Brinkmann U, Oyen W G J, Boerman O C., Zirconium-89 Labeled Antibodies: A New Tool for Molecular Imaging in Cancer Patients. BioMed Research International 2014, article ID 203601, 13.

[74] Sato N, S. L., Choyke P, Cell labeling using Zr-89-comparison with In-111 oxine. Proceedings World Molecular Imaging Congress, Savannah, G A, 2013, 2013: p. P533.

[75] Charoenphun P, Meszaros L K, Chuamsaamarkkee K, Sharif-Paghaleh E, Ballinger J R, Ferris T J, Went M J, Mullen G E D, Blower P J., [$^{89}$Zr]Oxinate for long-term in vivo cell tracking by positron emission tomography. Eur J Nucl Med Mol Imaging. 2015; 42: 278-87.

[76] Davidson-Moncada J, Sato N, Hoyt Jr. R F, Reger R N, Thomas M, Clevenger R, Metzger M E, Donahue R E, Eclarinal P C, Szajek L, Griffiths G L, Dunbar C E, Choyke P, Childs R., A Novel method to study the vivo trafficking and homing of adoptively transferred NK cells in Rhesus Macaques and Humans. Proceedings of the 56th Annual Meeting of the American Society of Hematology, San Francisco, Calif., Dec. 6-9, 2014. Abstract #659.

[77] Bansal A, Pandey M K, Demirhan Y E, Nesbitt J J. Crespo-Diaze R J, Terzic A, Beffar A, DeGrado T R., Eur J Nucl Med Mol Imaging Research 2015; 5:19.

[78] Sadeghi M, Kakavand T, Taghilo M., Targetry of $Y_2O_3$ on a copper substrate for the non-carrier-added $^{89}$Zr production via $^{89}$Y(p,n)$^{89}$Zr reaction. Kerntechnik. 2010; 75:298-302.

[79] Holland J P, Sheh Y, Lewis J S., Standardized methods for the production of high specific-activity zirconium-89. Nucl. Med. Biol. 2009; 36:729-739.

[80] Pandey M K, Engelbrecht H P, Byrne J P, Packard A B, DeGrado T R., Production of $^{89}$Zr via the $^{89}$Y(p,n)$^{89}$Zr reaction in aqueous solution: effect of solution composition on in-target chemistry. Nucl. Med. Biol. 2014; 41:309-316.

[81] Pandey M K, Byrne J F, Jiang H, Packard A B, DeGrado T R., Cyclotron production of $^{68}$Ga via the $^{68}$Zn (p,n)$^{68}$Ga reaction in aqueous solution. Am J Nucl Med Mol Imaging 2014; 70: 2308-2312.

[82] Verel I, Visser G W M, Boellaard R, Stigter-van Walsum M, Snow G B, van Dongen GAMS., $^{89}$Zr immuno-PET: comprehensive procedures for the production of $^{89}$Zr-labeled monoclonal antibodies. J Nucl Med 2003; 44:1271-1281.

[83] Meijs W E, Herscheid J D M, Haisma H J, Wijbrandts R, van Langevelde F, van Leuffen P J, Mooy R, Pinedo H M., Production of highly pure no-carrier added $^{89}$Zr for the labelling of antibodies with a positron emitter. Appl Radiat Isotopes 1994; 45:1143-1147.

[84] Pandey M K, DeGrado T R, Qian K, Jacobson M S, Clinton H E, Duclos Jr. R I, Gatley S J., Synthesis and Preliminary Evaluation of N-(16-$^{18}$F-fluorohexadecanoyl)ethanolamine ($^{18}$F-FHEA) as a PET Probe of N-Acylethanolamine Metabolism in Mouse Brain. ACS Chem Neurosci, 2014; 5(9):793-802.

[85] Socrates G., Infrared and Raman characteristic group frequencies: Tables and Charts. 3rd ed. Wiley, 2004.

The citation of any document or reference is not to be construed as an admission that it is prior art with respect to the present invention.

Thus, the present invention provides methods of producing and isolating $^{68}$Ga, $^{89}$Zr, $^{64}$Cu, $^{63}$Zn, $^{86}$Y, $^{61}$Cu, $^{99m}$Tc, $^{45}$Ti, $^{13}$N, $^{52}$Mn, or $^{44}$Sc and solution targets for use in the methods are disclosed. The methods of producing $^{68}$Ga, $^{89}$Zr, $^{64}$Cu, $^{63}$Zn, $^{86}$Y, $^{61}$Cu, $^{99m}$Tc, $^{45}$Ti, $^{13}$N, $^{52}$Mn, or $^{44}$Sc include irradiating a closed target system with a proton beam. The closed target system can include a solution target. The methods of producing isolated $^{68}$Ga, $^{89}$Zr, $^{64}$Cu, $^{63}$Zn, $^{86}$Y, $^{61}$Cu, $^{99m}$TC, $^{45}$Ti, $^{13}$N, $^{52}$Mn, or $^{44}$Sc further include isolating $^{68}$Ga, $^{89}$Zr, $^{64}$Cu, $^{63}$Zn, $^{86}$Y, $^{61}$Cu, $^{99m}$Tc, $^{45}$Ti, $^{13}$N, $^{52}$Mn, or $^{44}$Sc by ion exchange chromatography. An example solution target includes a target body including a target cavity for receiving the target material; a housing defining a passageway for directing a particle beam at the target cavity; a target window for covering an opening of the target cavity; and a coolant flow path disposed in the passageway upstream of the target window.

Although the invention has been described with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for producing a solution including a radionuclide, the method comprising:
   (a) bombarding a target solution comprising an aqueous solution of a nitrate salt of a metal in the presence of dilute nitric acid in a target cavity of a solution target with protons to produce a solution including a radionuclide, wherein the radionuclide is $^{68}$Ga,
   wherein the target cavity is cooled with a coolant during the bombardment.

2. The method of claim 1, wherein the target solution is bombarded with protons in the target cavity of the solution target operating as a closed system.

3. The method of claim 2, wherein the solution target has a volume capacity of two milliliters or less.

4. The method of claim 2, wherein the target cavity is defined by a generally conical wall and a target window foil.

5. The method of claim 1, wherein the target solution comprises $^{68}$Zn-enriched zinc nitrate.

6. The method of claim 1 wherein the concentration of nitric acid in the target solution is 0.1 M to 2 M.

7. The method of claim 1, wherein step (a) comprises bombarding the target solution with a particle beam having an energy of 15 MeV or less.

8. The method of claim 1, further comprising:
   (b) passing the solution including the radionuclide through a column including a sorbent to adsorb the radionuclide on the sorbent; and
   (c) eluting the radionuclide off the sorbent.

9. The method of claim 8, wherein the sorbent comprises a hydroxamate resin.

10. The method of claim 8, wherein step (c) comprises eluting the radionuclide off the sorbent using a phosphate.

11. The method of claim 8, wherein the radionuclidic purity of the radionuclide is greater than 99% after step (c).

12. The method of claim 8, further comprising:
    (d) passing the eluted radionuclide through a second column including a sorbent.

13. The method of claim 8, wherein step (c) comprises eluting the radionuclide off the sorbent at a pH of 3.5 to 7.

* * * * *